United States Patent [19]
Watabe et al.

[11] Patent Number: 5,943,086
[45] Date of Patent: Aug. 24, 1999

[54] MULTIPLE BEAM INDEPENDENT ACTIVATION SYSTEM AND METHOD FOR SIMULTANEOUS IMAGE FORMATION

[75] Inventors: Teruyasu Watabe, Kanagawa; Kazuyuki Shimada, Tokyo, both of Japan

[73] Assignee: Ricoh Company, Ltd., Japan

[21] Appl. No.: 08/839,059

[22] Filed: Apr. 23, 1997

[30] Foreign Application Priority Data

Mar. 11, 1996 [JP] Japan .................................. 9-056000
Apr. 25, 1996 [JP] Japan .................................. 8-105670
Jun. 17, 1996 [JP] Japan .................................. 8-175475
Apr. 21, 1997 [JP] Japan .................................. 9-103273

[51] Int. Cl.$^6$ .................................................. H04N 1/047
[52] U.S. Cl. .......................... 347/235; 347/250; 250/206
[58] Field of Search .................................... 347/235, 250; 250/235, 206; 358/475; 348/545

[56] References Cited

U.S. PATENT DOCUMENTS 4,933,549  6/1990  Fujioka et al. ........................... 250/235
5,014,137  5/1991  Shimada ................................... 358/410
5,140,157  8/1992  Ohshima et al. ........................ 250/235
5,576,852  11/1996 Sawada et al. .......................... 358/475
5,790,200  8/1998  Tsujimoto et al. ...................... 348/545

FOREIGN PATENT DOCUMENTS 2-188713   7/1990   Japan .
3-76063   12/1991   Japan .
5-60085    9/1993   Japan .
6-246964   9/1994   Japan .

*Primary Examiner*—N. Le
*Assistant Examiner*—Hai C. Pham
*Attorney, Agent, or Firm*—Knoble & Yoshida LLC

[57] ABSTRACT

The current disclosure is directed to a multiple beam control unit for generating independent control signals each of which is used as a beam activation signal as well as a beam detection confirmation signal for a corresponding one of the multiple beams so as to accurately synchronize each of the beams. The multiple beams are thus independently ascertained to form a desired image at a predetermined location on am image forming surface.

22 Claims, 26 Drawing Sheets

MULTIPLE BEAM INDEPENDENT ACTIVATION SYSTEM AND METHOD FOR SIMULTANEOUS IMAGE FORMATION

FIELD OF THE INVENTION

The current invention is generally related to a multiple beam control unit in an image-forming system, and more particularly related to a multiple beam control unit for generating independent control signals which are used as a beam activation signal as well as a beam detection confirmation signal so as to generate a synchronization signal for activating the beam on an image forming surface at a predetermined location.

BACKGROUND OF THE INVENTION

In general, in order to form a desired image on an image-carrying medium such as paper, the desired image is temporarily duplicated on an image-forming surface 5 before transferring it onto the image-carrying medium. More particularly, referring to FIG. 1, a conventional image-forming system is illustrated. A light source 1 emits a light beam through a colimeter lens 2 towards a rotatable scanner 3 such as a polygon mirror having multiple reflecting surfaces. The beam is reflected by one of the reflecting surfaces towards an image-forming surface 5 such as a photoreceptor drum via a fθ lens 4. Since the scanner 3 is rotated as indicated by an arrow, the reflected beam is scanned over the image-forming surface 5 in a predetermined scanning direction as indicated by another arrow. Consequently, a desired image is formed by the scanning beam as the photoreceptor drum rotates in a sub-scanning direction as indicated by a third arrow.

Still referring to FIG. 1, to scan the beam in order to form a desired image, a precise onset timing is required for each scanning beam to initiate the image formation at a predetermined location on the image-forming surface 5. To accomplish the above described precise timing, one method is to detect the scanning beam prior to reaching the image-forming surface 5 at a predetermined beam detection location outside the image-forming surface 5 and then to delay the initiation of the image forming process by a predetermined amount of time. To implement the above method, a beam detector 6 such as a photo sensor is located near the photoreceptor drum 5, and after the scanning beam is detected, the image forming process by the same scanning beam is delayed by a predetermined amount of time based upon a constant predetermined rotational speed of the scanner 3. The above implementation also requires that mechanical parts are not thermally effected to cause a substantial variation in the desired predetermined delay. However, neither the constant rotational speed nor the thermal expansion effect is generally guaranteed in an image forming apparatus.

Referring to FIG. 2, to improve the above described problems, Japanese Patent Hei 5-60085 which was published on Sep. 1, 1993 discloses a single beam synchronization confirmation system for synchronizing each sweep of a single scanning beam to initiate the image formation at a predetermined location on an image-forming surface. The single beam synchronization confirmation system includes a synchronization signal modulation unit 11 for generating a synchronization modulation signal indicative of an expected arrival timing of the scanning beam at a photosensor and a photosensor for detecting the scanning beam and generating a photosensor output signal. The synchronization modulation signal is logically ANDed with the photosensor output signal at an AND gate 16. The AND gate outputs a high signal or a synchronization signal only when the synchronization modulation signal and the photo sensor output signal are contemporaneous. The synchronization signal is fed back to the synchronization signal modulation unit 11 for further modulating the synchronization modulation signal as well as to an image scanning clock signal generation unit 12 for generating a scanning clock signal. Based upon the scanning clock signal and the synchronization modulation signal, an image control unit 13 initiates an image generation unit 14 and drives a light source activation unit 15 for activating the beam according to a desirable image.

Now referring to FIG. 3, the above described single beam synchronization confirmation system performs the synchronization as illustrated in a timing chart. The synchronization modulation signal has a period $T_0$ and an image forming period of T. In other words, a scanning beam has a period T for forming an image along one line on an image forming surface at a frequency of $1/T_0$. The synchronization modulation signal remains high for a predetermined amount of time. During this onset period of the synchronization modulation signal, a scanning light beam is expected to arrive at a photosensor. When the photosensor indeed detects the expected scanning beam, the photosensor generates a photo sensor output signal. As described above, a logical AND gate compares the photo sensor output signal and the synchronization modulation signal, and its HIGH output is a synchronization signal. In response to the synchronization signal, the synchronization modulation signal is deactivated until a next onset after an amount of time $T_0$.

Still referring to FIG. 3, based upon the synchronization signal, after the predetermined delay following the synchronization signal, an image signal is initiated so as to form a desired image at a predetermined location on an image forming surface. A modulation signal A illustrates a positive-positive process with erasing signals juxtaposing the image signal while a modulation signal B illustrates a negative-positive process without the erasing signals. In contrast, in the absence of the synchronization modulation signal, an accidental photo sensor output signal such as a noise A alone does not cause the AND gate to generate the synchronization signal. By the same mechanism, when the light beam detection does match the expected arrival indicated by the synchronization modulation signal, the synchronization signal is not generated, and the image formation is prevented from starting at an undesirable location on an image forming surface. Because of the above described safeguarded generation of the synchronization signal, the onset for the image formation is more precisely determined.

In applying the above described single beam confirmation technique to a multiple beam image forming process, referring to FIGS. 4, a synchronization signal modulation unit 20 generates a synchronization modulation signal SMS and is connected to an image generation control unit 32 for forming a desired image using multiple light beams $Ld_1$ through $Ld_n$ based upon the common synchronization modulation signal. During an image formation, an image data output unit 30 outputs an image output signal to the image generation control unit 32 in order to form a desired image. An AND gate 24 also receives the synchronization modulation signal as well as a photosensor detection signal from a photosensor 22 which is located at a predetermined light detection location outside of an image forming surface. If the above two signals are simultaneously activated, the AND gate outputs a HIGH or ON signal to a synchronization signal generation unit 26. Based upon the AND gate ON signals, the synchronization signal generation unit 26 sequentially activates a series of synchronization signals $SS_1$ through $SS_n$, each of which is supposedly indicative of a corresponding light beam arriving at the photosensor 22. Upon the activation of the first synchronization signal $SS_1$, a line counter 28 is initialized, and upon completing a predetermined amount of time, the line counter 28 outputs a line completion signal to the synchronization signal modulation unit 20, and the synchronization signal modulation unit 20 activates a synchronization modulation signal SMS.

Referring to FIGS. 5A and 5B, timing charts illustrate a synchronization problem associated with the above described multiple beam image forming system. FIG. 5A illustrates a situation where every one of the multiple beams $Ld_1$ through $Ld_n$ is correctly activated, scanned by a scanner and sequentially detected by a common photo sensor. For the purpose of simplicity, only the beams $Ld_1$ and $Ld_n$ are represented in solid lines in the timing chart, and any other beams between the two beams are abbreviated and illustrated by dotted-line representations. In response to an onset of a line counter signal LCS, a synchronization modulation signal SMS is activated. During the activated synchronization modulation signal SMS, the multiple beams are expected to sequentially arrive at the common photosensor. For each detection of the multiple beams $Ld_1$ through $Ld_n$, a corresponding photosensor detection signal ($PSDS_1$ through $PSDS_n$) is generated. Each of the photosensor detection signals $PSDS_1$ through $PSDS_n$ and the synchronization modulation signal SMS are logically ANDed to generate a corresponding synchronization signal ($SS_1$ through $SS_n$). Upon the detection of a predetermined n number of photosensor detection signals, the synchronization modulation signal SMS is deactivated until the next line counter signal.

Now referring to FIG. 5B, for various reasons, every one of the multiple beams $Ld_1$ through $Ld_n$ is not always correctly activated, scanned or detected. As described above, a timing chart illustrates that a synchronization modulation signal SMS is activated in response to a line completion signal LCS. This timing chart also illustrates a situation where a first photosensor detection signal $PSDS_1$ is not generated, and the missing first photosensor detection signal $PSDS_1$ is indicated by dotted lines. For example, this failure may be caused by an obstructed beam path, a malfunctioning photosensor or a malfunctioning light source. Because of this missing photosensor detection signal, a corresponding synchronization signal $SS_1$ is not generated. For the rest of the photosensor detection signals $PSDS_2$ through $PSDS_n$, although corresponding synchronization signals $SS_2$ through $SS_n$ are generated, the first synchronization signal $SS_2$ is counted as a first synchronization signal, and thus, a number of actually generated synchronization signals becomes n−1 after the $PSDS_n$. In order to complete the count, the first synchronization signal $SS_2$ should be treated as the second synchronization signal since another synchronization signal should have preceded the first synchronization signal $SS_2$. Consequently, the synchronization modulation signal is left activated after the last photosensor signal $PSDS_n$ due to the failure to count the predetermined n synchronization signals.

Other problems associated with synchronizing multiple beams include off-timing of multiple beams arriving at a photosensor. In other words, even if a photosensor detects each of the multiple beams, some of the beams may not be traveling at an assumed velocity and arrive at the photosensor in an unexpected time frame. For example, this may be caused by an unstable rotational speed of a polygon mirror. Under such a condition, the above described prior art technique does not allow each individual beam arrival to generating a corresponding accurate synchronization signal for an initiating image writing process.

Additional prior art attempts for synchronizing multiple beams include Japanese Patent Hei 6-246964, which discloses a synchronization circuit to trigger an independent multivibrator directly in response to a photo sensor output signal indicative of detecting each beam. An output signal from the multivibrator is used to synchronize an image processing process. This and other prior art attempts such as Japanese Patents Hei 2-188731 and Hei 3-76063 also disclose slits placed between a light source and a photosensor for improving the photosensor detection of each of the multiple beams.

As described above, the application of the prior art synchronization techniques does not solve a number of problems associated with multiple beam synchronization. In particular, the prior art techniques fail to identify or ascertain individual beams for the photosensor detection as well as the generation of a synchronization signal. The current invention is directed to ascertain the beam activation, the beam detection as well as the synchronization signal generation for each of multiple beams.

SUMMARY OF THE INVENTION

In order to solve the above and other problems, according to one aspect of the current invention, a method of controlling multiple beams emitted towards a photo sensor located outside an image forming surface at a predetermined beam sensing location, each of the multiple beams forming a desired image on the image forming surface in a predetermined scanning direction starting at a predetermined image onset location, includes: a) scanning the multiple beams towards the predetermined beam sensing location; b) generating a predetermined number of independent beam control signals; c) independently activating each of the multiple beams in response to a corresponding one of the independent beam control signals as each of the multiple beam approaches the predetermined beam sensing location; and d) ascertaining that each of the independently activated multiple beams has reached the predetermined beam sensing location in a predetermined synchronized fashion according to the corresponding one of the independent beam control signals.

According to a second aspect of the current invention, a method of controlling multiple beams emitted towards a photo sensor located outside an image forming surface at a predetermined beam sensing location, each of the multiple beams forming a desired image on the image forming surface in a predetermined scanning direction starting at a predetermined image onset location, including: a) scanning the multiple beams towards the predetermined beam sensing location; b) generating a predetermined number of independent beam control signals; c) independently activating each of the multiple beams in response to a corresponding one of the independent beam control signals as each of the multiple beam approaches the predetermined beam sensing location; and d) ascertaining that each of the independently activated multiple beams has reached the predetermined beam sensing location in a predetermined synchronized fashion according to the corresponding one of the independent beam control signals.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

DETAILED DESCRIPTION OF THE PREFERRED EMBODIMENT(S)

Figure 1:
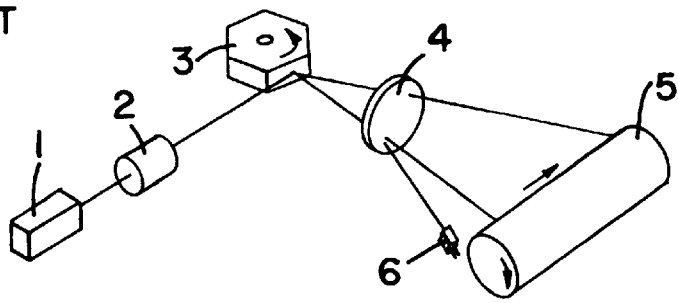
FIG. 1 illustrates a prior art single beam image scanning system for forming an image.
Figure 3:
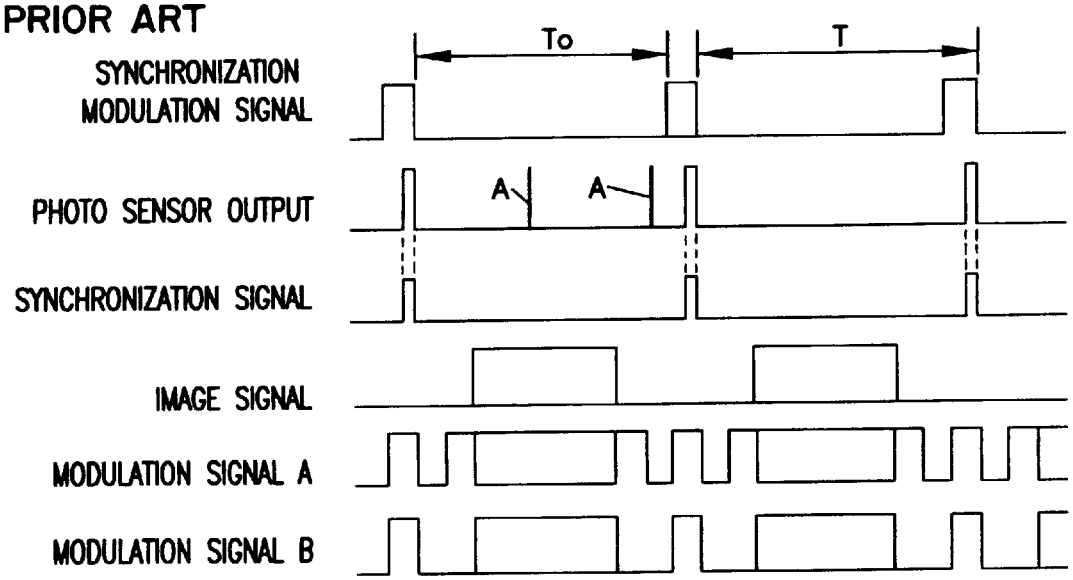
FIG. 3 is a timing chart illustrating the operation of the prior art single beam image scanning system.
Figure 2:
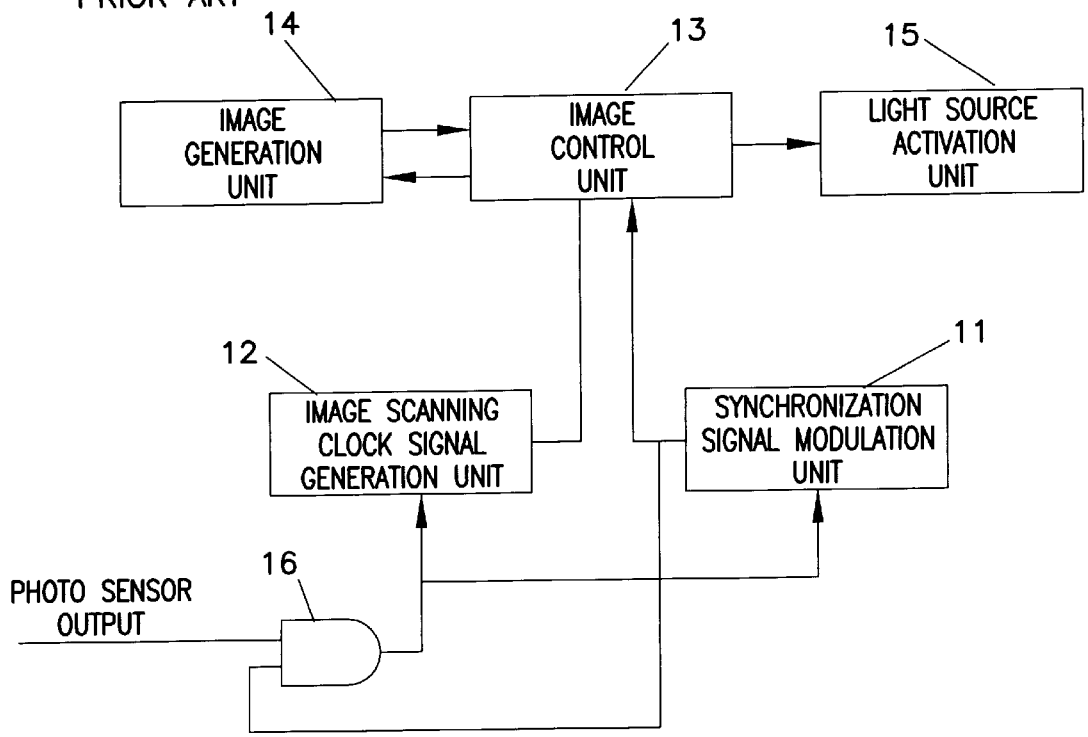
FIG. 2 is a block diagram illustrating a prior art single beam image scanning system for forming an image.
Figure 4:
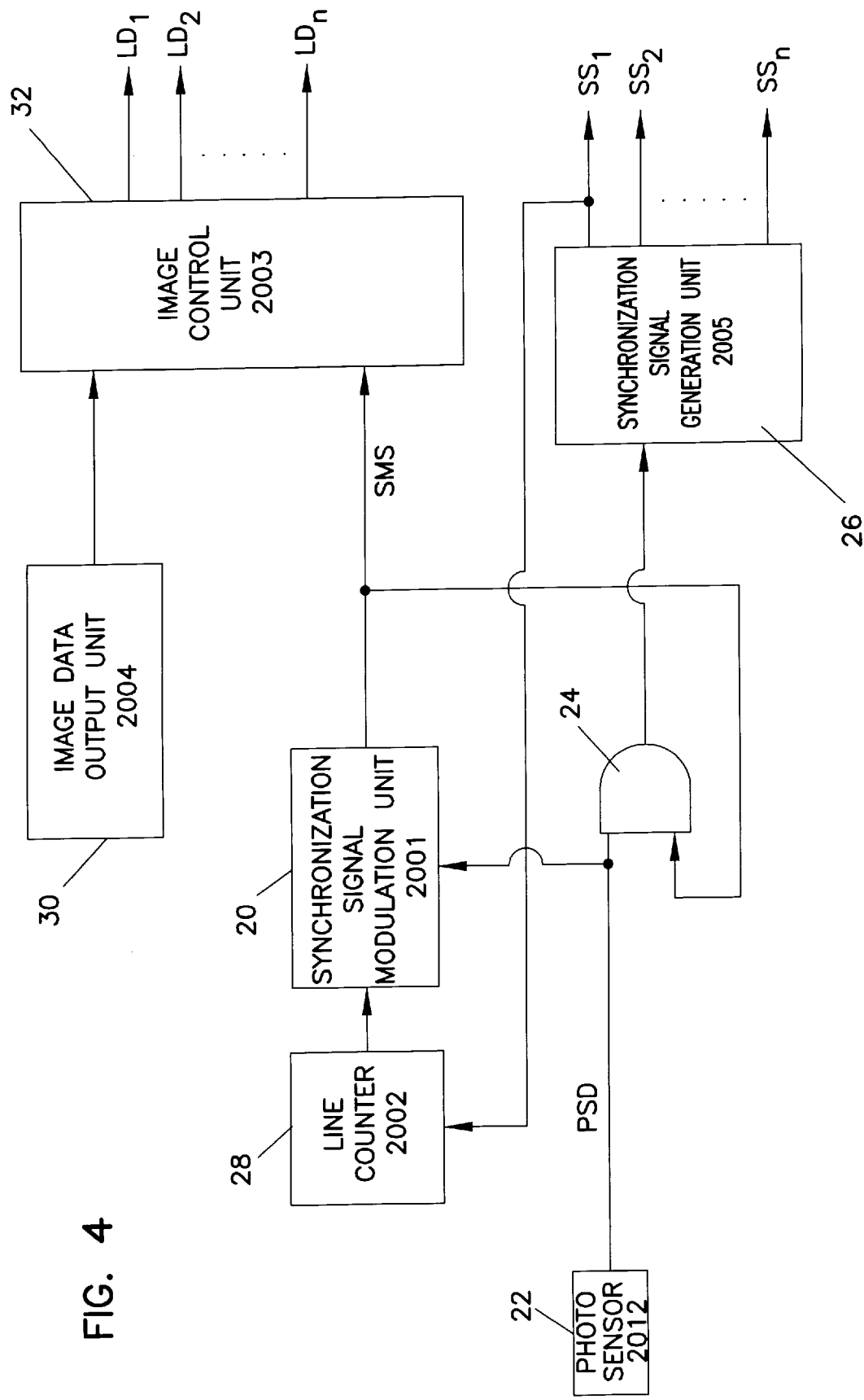
FIG. 4 is a block diagram illustrating a multiple beam image scanning system using the synchronization technique used in the prior art single beam scanning system.
Figure 5:
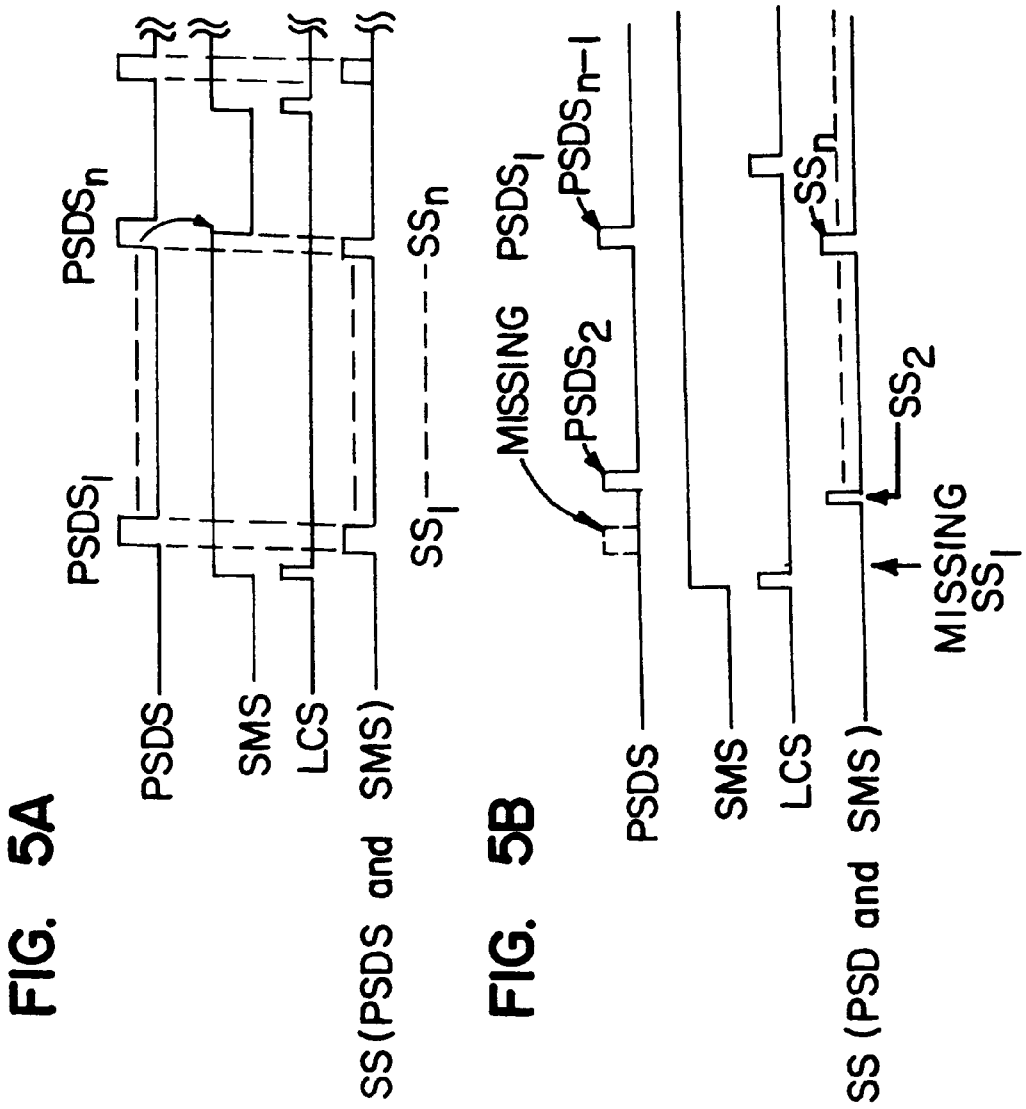
FIGS. 5A and 5B are timing charts illustrating problems associated with the operation of the multiple beam image scanning system as shown in FIG. 4.
Figure 6:
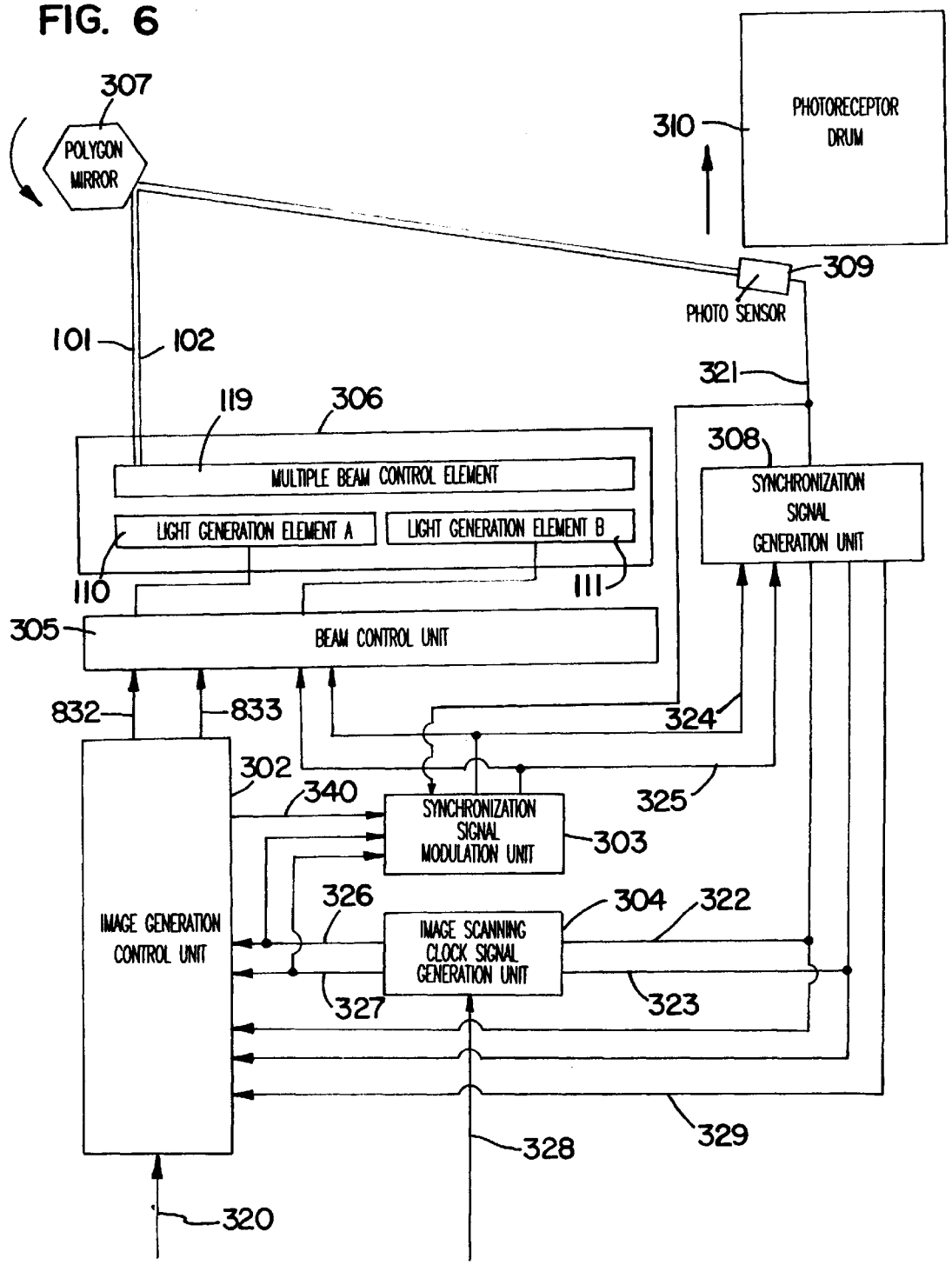
FIG. 6 is a block diagram illustrating a first preferred embodiment of the multiple beam synchronization system according to the current invention.

Referring now to the drawings, wherein like reference numerals designate corresponding structure throughout the views, and referring in particular to FIG. 6, one preferred embodiment of the multiple beam synchronization system according to the current invention includes a beam control unit 305 for controlling a multiple beam generation unit 306 which generates multiple beams and emits the multiple beams towards a scanner or a polygon mirror 307. The multiple beam generation unit 306 further includes a first light generation element A, 110 for emitting a first light beam 101, a second light generation element B, 111 for emitting a second light beam 102 and a multiple beam control element 119 for juxtaposing the two light beams 101 and 102. The polygon mirror 307 has a predetermined number of reflecting surfaces and rotates at a relatively constant angular velocity in a predetermined direction as indicated by an arrow. Because of the rotation, the reflected light beams scan in a predetermined scanning direction as indicated by another arrow with respect to an image forming surface such a photoreceptor drum 310 and a beam sensor such as a photosensor 309 located near the photoreceptor drum 310. The scanning multiple beams arrive at the photosensor 309 prior to reaching the photoreceptor drum surface 310 which is rotated in a sub-scanning direction perpendicular to the beam scanning direction.

Still referring to FIG. 6, a synchronization signal modulation until 303 generates a predetermined number of independent beam control signals or independent synchronization modulation signals. According to one preferred embodiment according of the current invention, the synchronization modulation signals include a first modulation signal and a second modulation signal and are simultaneously outputted respectively via a first modulation line 324 and a second modulation line 325 to the beam control unit 305 as well as to the synchronization signal generation unit 308. These synchronization modulation signals have dual functions for synchronously controlling the beam activation as well as for ascertaining that independently activated multiple beams have reached the predetermined beam sensing location in a predetermined synchronized fashion as determined by the synchronization modulation signals.

Still referring to FIG. 6, upon detecting any one of the multiple beams, the photosensor 309 generates a photosensor detection signal and transmits the signal to a synchronization signal generation unit 308 as well as the synchronization signal modulation unit 303 via a beam detection line 321. The synchronization signal generation unit 308 generates an independently identifiable synchronization signal or an independent confirmation signal based upon the photosensor detection signal and the synchronization modulation signal. The synchronization signals in this preferred embodiment include a first synchronization signal indicative of the confirmation that the first light beam activated by the first modulation signal has arrived the photosensor 309 during an expected period as specified by the first modulation signal. Similarly, the synchronization signals also include a second synchronization signal indicative of the confirmation that the second light beam activated by the second modulation signal has arrived the photosensor 309 during an expected period as specified by the second modulation signal. The synchronization signal generation unit 308 outputs the synchronization signals to an image scanning clock signal generation unit 304 and an image generation control unit 302 respectively via a first synchronization line 322 and a second synchronization line 323.

Based upon the synchronization signals, the image formation process is synchronized in the following manner. In response to the synchronization signals, the image scanning clock signal generation unit 304 resets a clock cycle according the scanning phase of the scanning light beams and generates an independent image scanning clock signal for respective light beams based upon an externally supplied clock signal via an external clock input line 328. The image scanning clock signal generation unit 304 outputs a first scanning clock signal and a second scanning clock signal to the image generation control unit 302 as well as to the synchronization signal modulation unit 303 respectively via a first clock signal line 326 and a second clock signal line 327. In response to the independent image scanning clock signals and the independent synchronization signals, the image generation control unit 302 generates independent image writing signals according to image data inputted via an image input line 320 and outputs the beam control unit 305 the image writing signals via a first image writing signal line 832 and a second image writing signal line 833. Under any one of predetermined conditions, the image generation control unit 302 resets the synchronization signal modulation unit 303 via a reset line 340.

Figure 7:
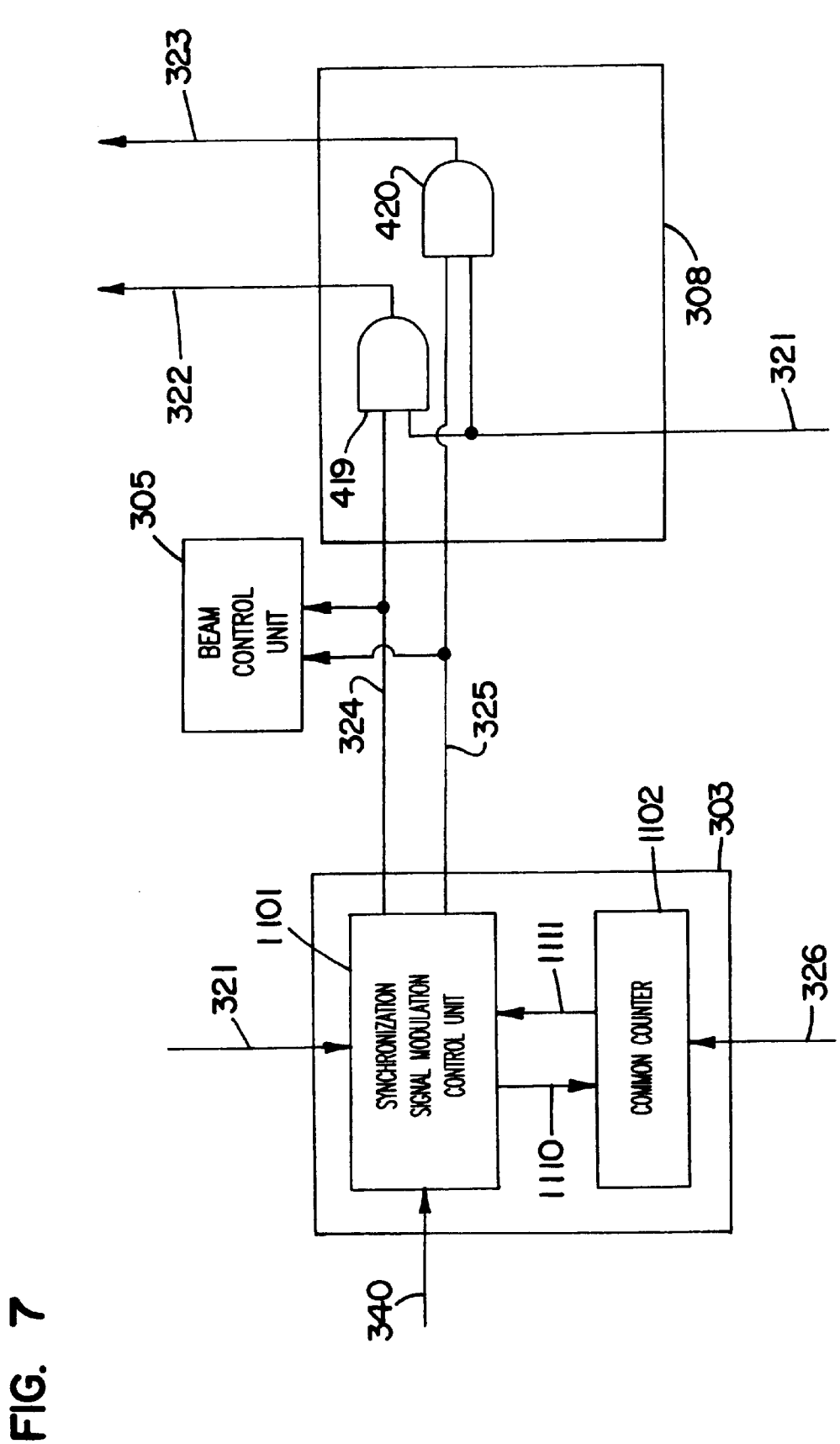
FIG. 7 is a block diagram illustrating more detailed aspects of some units in the first preferred embodiment according to the current invention.

Now referring to FIG. 7, in the above described one preferred embodiment of the multiple beam synchronization system according to the current invention, the synchronization signal generation unit 308 and the synchronization signal modulation unit 303 are each further described. The synchronization signal generation unit 308 further includes a first logical AND gate 419 and a second logical AND gate 420. Both of the logical AND gates 419 and 420 receive a photo sensor detection signal from a photo sensor via a beam detection line 321. The first AND gate 419 receives a first modulation signal via a first modulation line 324 while the second AND gate 420 receives a second modulation signal via a second modulation line 325. Thus, the first and second AND gates respectively output a high or on signal for confirming that a corresponding light beam has expectedly arrived at the photosensor as specified by the onset of the corresponding modulation signal and correctly detected and for indicating a synchronization timing of the image writing process.

Still referring to FIG. 7, the synchronization signal modulation unit 303 outputs first and second synchronization modulation signal via first and second modulation signal lines 324 and 325 to both a beam control unit 305 as well as to the synchronization signal generation unit 308. The synchronization signal modulation unit 303 further includes a synchronization signal modulation control unit 1101 and a common counter 1102. The synchronization signal modulation control unit 1101 receives a reset signal via a reset line 340 from an image generation control unit 302, a count completion signal via a count completion line 1111 from the common counter 1102 as well as a photosensor detection signal via a detection line 321 from a photosensor. Based upon these three input signals, the synchronization signal modulation control unit 1101 controls the modulation signals. After a first modulation signal is activated, upon receiving a photosensor detection signal indicative of the detection of the first light beam, the synchronization signal modulation control unit 1101 deactivates the first modulation signal in the first modulation line 324. The counter 1102 initiates counting based upon a clock signal supplied from an image scanning clock signal generation unit via a clock line 326 after the activation of the first modulation signal in response to a counter reset signal via a reset line 1110. Although the clock line 326 is implemented as an external clock line, it is alternatively implemented as an internal clock line using an internal clock. The counter 1102 sends a full count or completion signal via a completion line 1111 to the synchronization signal modulation control unit 1101 upon completing a predetermined number of counts. Similarly, after a second modulation signal is activated, upon receiving the photosensor detection signal indicative of the detection of the second light beam, the synchronization signal modulation control unit 1101 deactivates the second modulation signal in the second modulation line 325.

Figure 8:
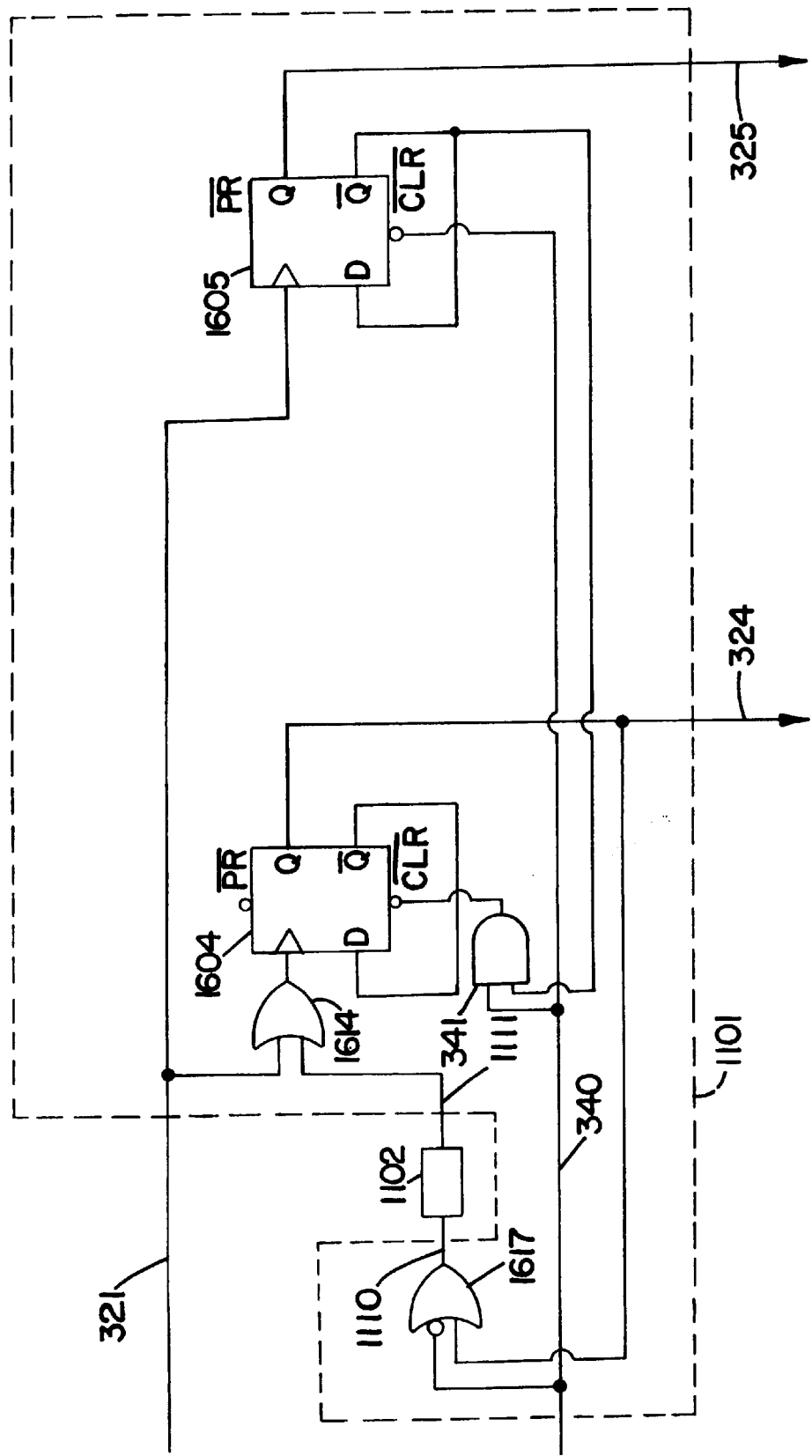
FIG. 8 is a circuit diagram illustrating one exemplary implementation of some units in the first preferred embodiment.

Now referring to FIG. 8, in the above described one preferred embodiment of the multiple beam synchronization system according to the current invention, the synchronization signal modulation control unit 1101 is further described for one exemplary implementation. A counter completion line 1111 provides an input signal to a first D latch flip-flop 1604 via an OR gate 1614 to trigger a first modulation signal in a first modulation line 324. On the other hand, a first photosensor detection signal indicative of detecting a first beam in the photosensor detection line 321 deactivates the first modulation signal via the same OR gate 1614. The first photosensor detection signal also triggers a second D latch flip-flop 1605 to onset a second modulation signal in a second modulation line 325. The second modulation signal is deactivated by a second photosensor signal in the photosensor detection line 321. The above flip-flops 1604 and 1605 are reset in part by a reset line 340 connecting to an image generation control unit. The reversed output Q bar of the second D flip-flop 1605 is outputted to a clear pin CLR of the first D flip-flop 1604 via an AND gate 341. Since the reset signal and the Q bar signal are both low active, the above described portion of the circuit including the AND gate 341 prevents the first flip-flop 1604 from being triggered unless it is being reset by the reset line 340 or the second flip-flop 1605. The first modulation line 324 and the reset line 340 also input a counter initiation signal to a common counter 1102 via a counter initiation line 1110 and a NOR gate 1617. In essence, the deactivated first modulation line 324 resets the counter 1102 and initiates a new counting cycle.

Figure 9:
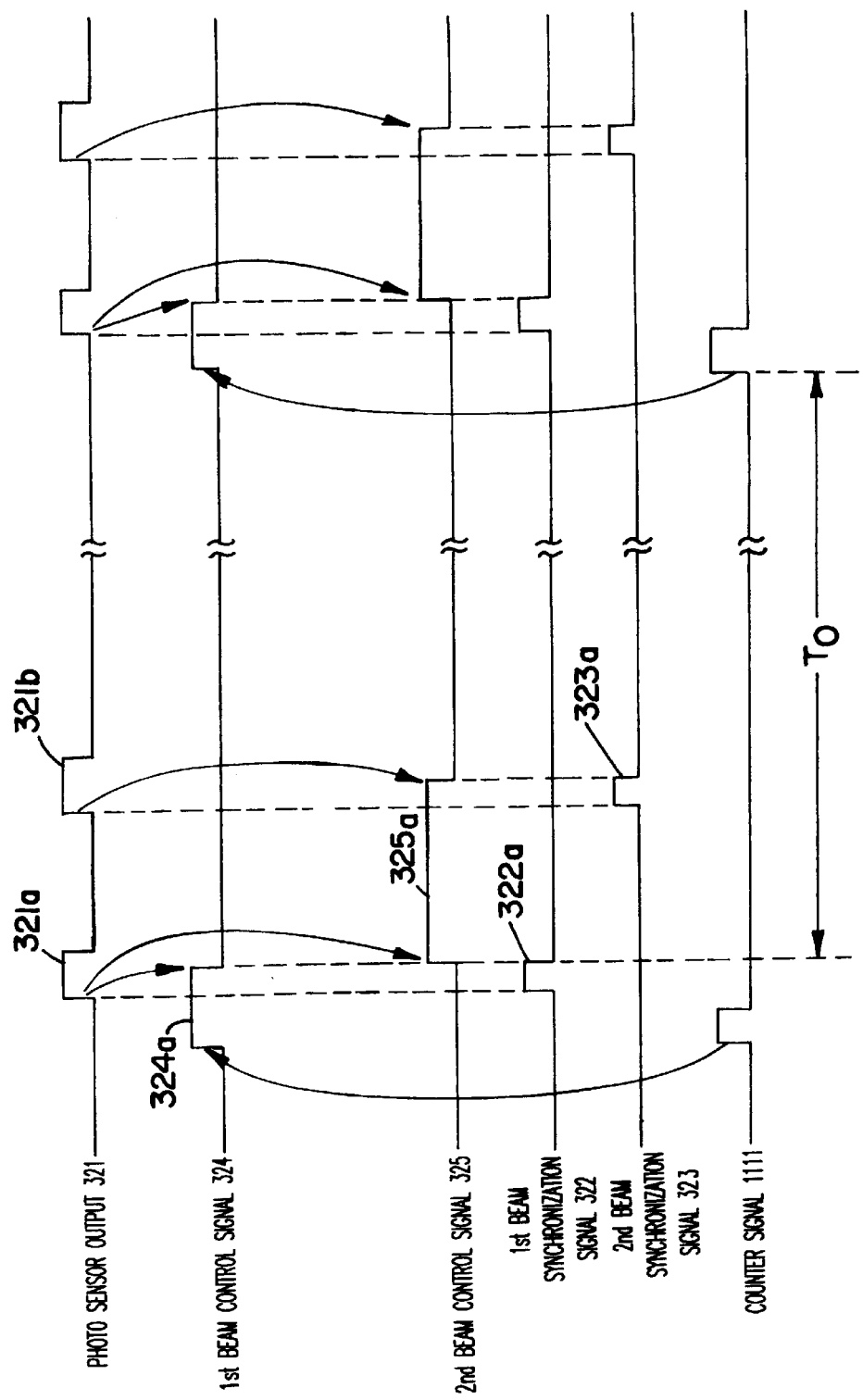
FIG. 9 is a timing chart illustrating the operations of the first preferred embodiment.

Now referring to FIG. 9, a timing chart illustrates the operation of the above described preferred embodiment of the multiple beam synchronization system according to the current invention. In response to a counter completion signal 1111, a first beam control signal or first beam synchronization modulation signal 324a is activated as indicated by a first arrow. The activation timing of the first beam synchronization modulation signal is set prior to an expected arrival of the first beam at a photosensor location so that the activation timing allows a sufficient amount of margin for some variations. During the onset period of the first beam control or synchronization modulation signal 324a, a photosensor detection output or photosensor output signal 321a is activated for the first time. As a result of the simultaneous onset of the 1st beam control signal 324a and the photosensor output signal 321a, a first beam synchronization signal 322a is generated. A falling edge of the first beam synchronization signal 322a initiates a counter for counting a predetermined period $T_0$. A rising edge of the first photosensor output signal 321a also triggers a second beam synchronization modulation or control signal 325a.

Still referring to FIG. 9, similarly, the activation timing of the second beam synchronization modulation signal 325a is set prior to an expected arrival of the second beam at a photosensor location so that the activation timing allows a sufficient amount of margin for some variations. While the second beam control signal 325a is up, when a second photosensor output signal 321b is contemporaneously outputted, a second beam synchronization signal 323a is generated. A rising edge of the second photosensor output signal 321b deactivates the second beam control signal 325a. The above described sequence of the events is repeated after the counter determines that a predetermined amount of time $T_0$ has elapsed and generates another counter completion signal 1111.

Figure 10:
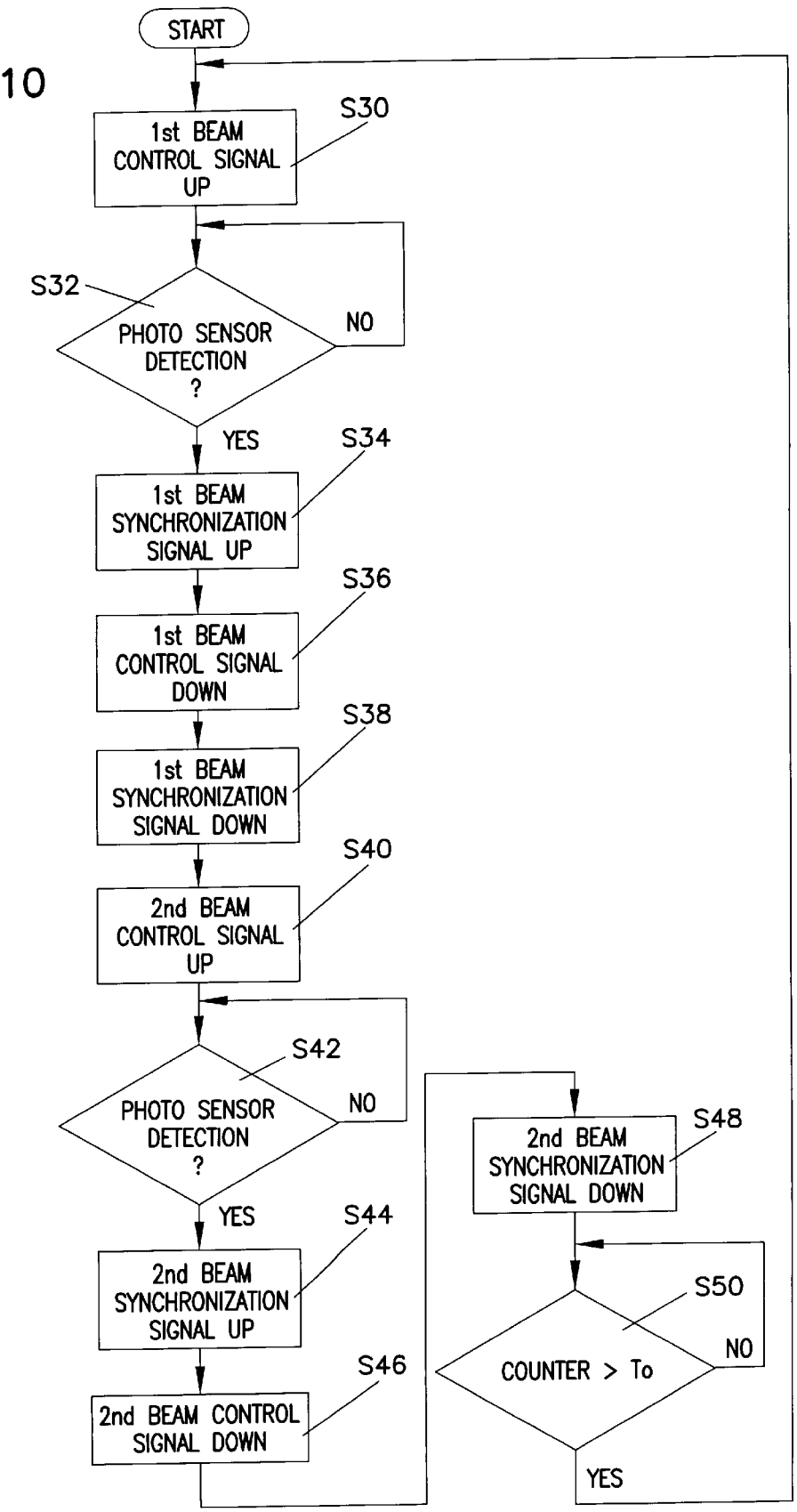
FIG. 10 is a flow chart illustrating steps performed by the first preferred embodiment.

Now referring to FIG. 10, a first preferred set of steps of the multiple beam confirmation process according to the current invention is described below. In a step S30, a first beam control signal or a first beam synchronization modulation signal is generated. While the first beam control signal is activated, in a step S32, the current process waits until a photosensor output or a photosensor detection signal is generated. Upon detecting the photosensor detection signal, in a step S34, the photosensor detection signal and the first beam synchronization modulation signal are logically ANDed to generate a first beam synchronization signal. In a step S36, the first beam control signal is deactivated. Following the step S36, the first beam synchronization signal is deactivated in a step S38. A second beam control signal or a second beam synchronization modulation signal is generated in a step S40. Similar to the first synchronization modulation signal, while the second beam synchronization modulation signal is up, a step S42 waits for another photosensor output. The second photosensor output and the second beam control or synchronization modulation signal are logically ANDed to generate a second beam synchronization signal in a step S44. The second beam control signal is deactivated in a step S46, and the second beam synchronization signal is subsequently deactivated in a step S48. Lastly, in a step S50, it is determined whether a predetermined amount of time $T_0$ has passed. If the predetermined amount $T_0$ has passed, the above described steps S30 through S48 are repeated.

Figure 11:
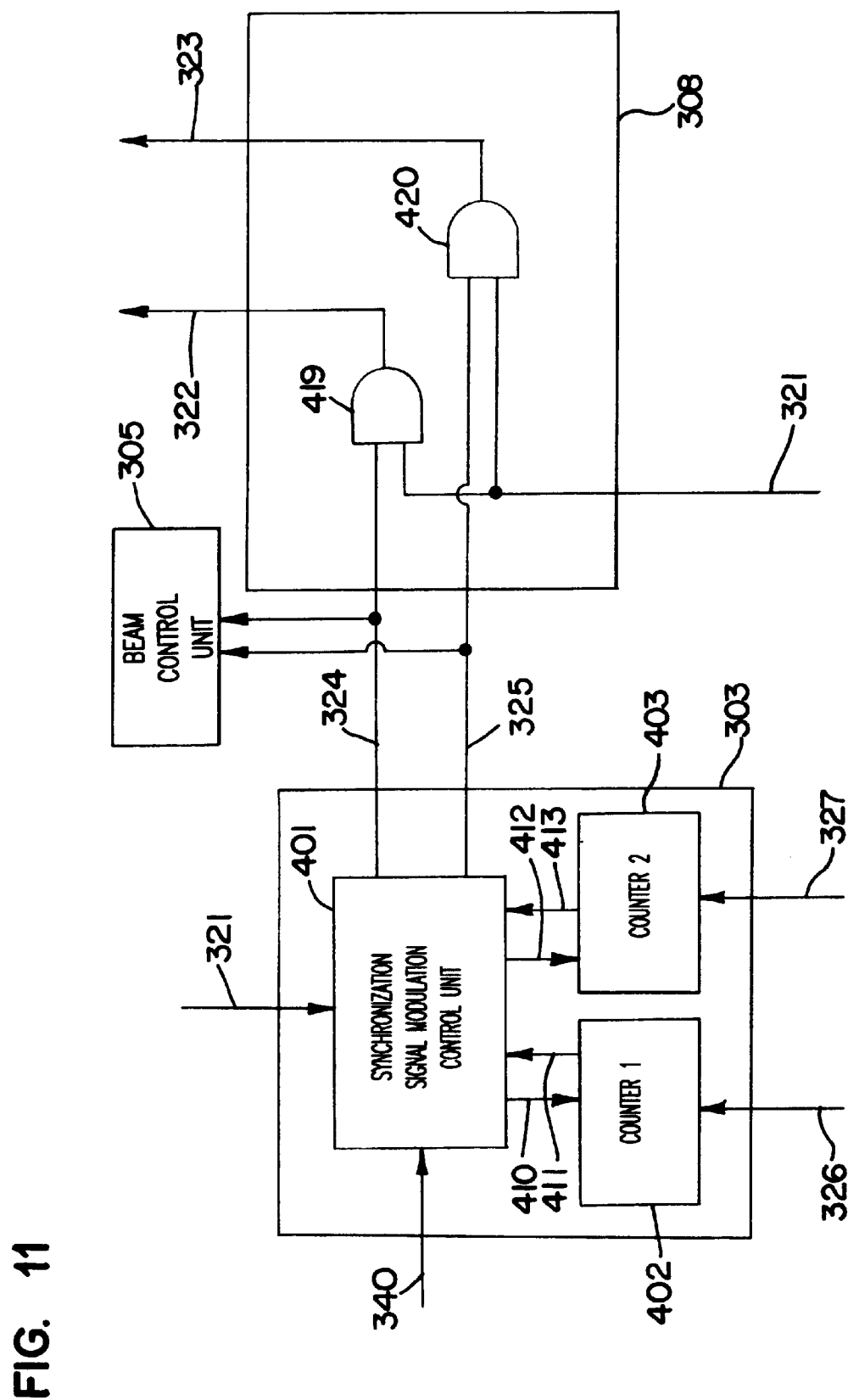
FIG. 11 is a block diagram illustrating more detailed aspects of some units in the second preferred embodiment according to the current invention.

Referring to FIG. 11, in the above described multiple beam synchronization system according to the current invention, an alternative embodiment of the synchronization signal generation unit 308 and the synchronization signal modulation unit 303 are each described in the following. The synchronization signal generation unit 308 further includes a first logical AND gate 419 and a second logical AND gate 420, and these AND gates 419 and 420 receive the substantially same input signals and generate the substantially same output signals as above described in reference to FIG. 7. A synchronization signal modulation unit 303 outputs first and second synchronization modulation signal via first and second modulation signal lines 324 and 325 to both a beam control unit 305 as well as to the synchronization signal generation unit 308. The synchronization signal modulation unit 303 further includes a pair of a first counter 402 and a second counter 403. Each of these separate counters 402 and 403 has an independent input and output lines to and from a synchronization signal modulation control unit 401. That is, the first counter 402 has an input line 410 and an output line 411 while the second counter has an input line 412 and an output line 413. In addition, the first counter 402 has a first external clock line 326 while the second counter 403 has a second external clock line 327. These independent counters 402 and 403 separately keeps track of a predetermined amount of time in response to an input signal via the input line 410 or 412, and upon completing the predetermined amount of time, the counters 402 and 403 respectively notify the synchronization signal modulation control unit 401 via the output line 411 or 413. Thus, the synchronization signal modulation control unit 401 generates a synchronization modulation signal via a respective line 324 or 325.

Figure 12:
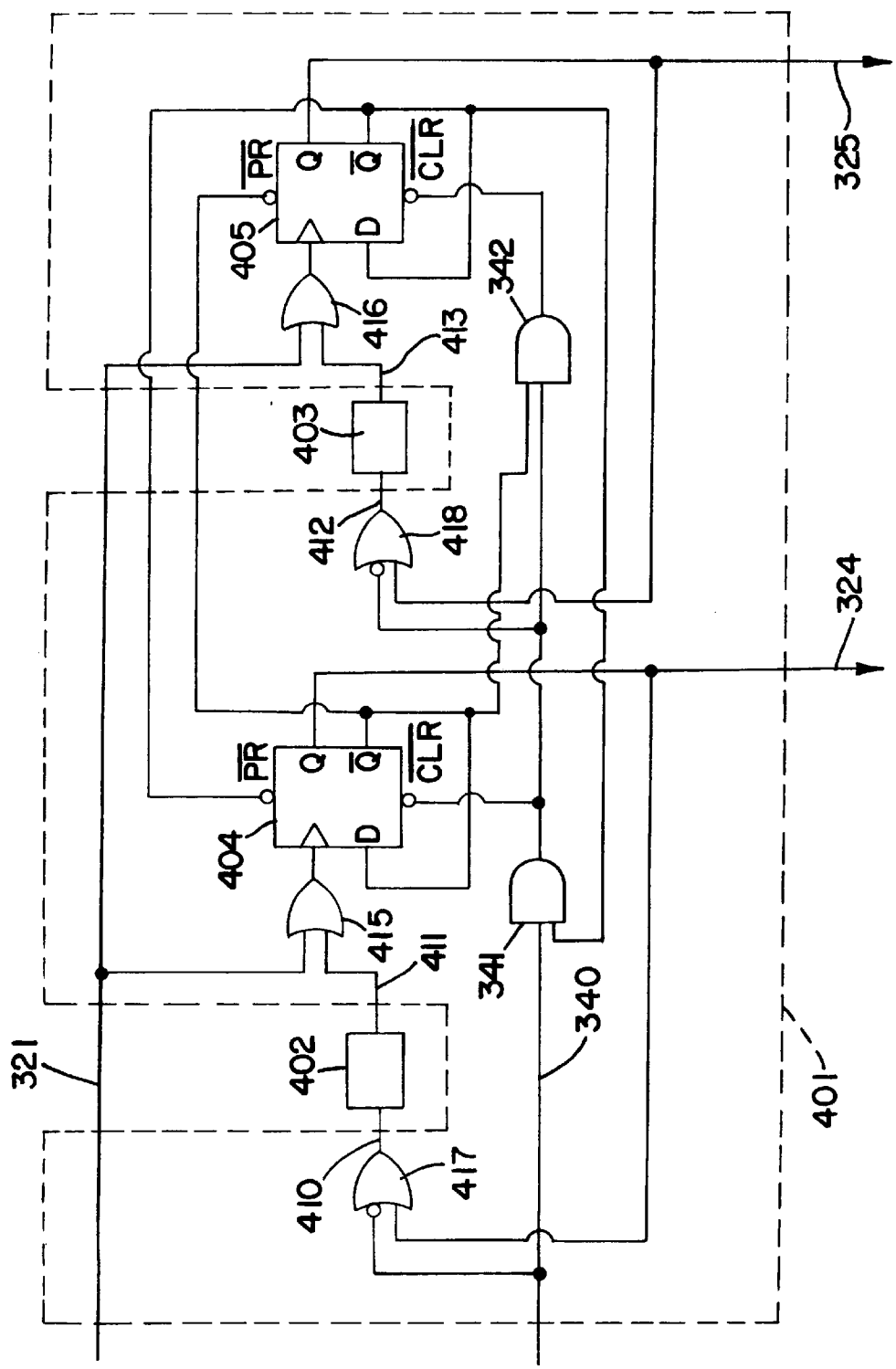
FIG. 12 is a circuit diagram illustrating one exemplary implementation of some units in the second preferred embodiment.
Figure 12A:
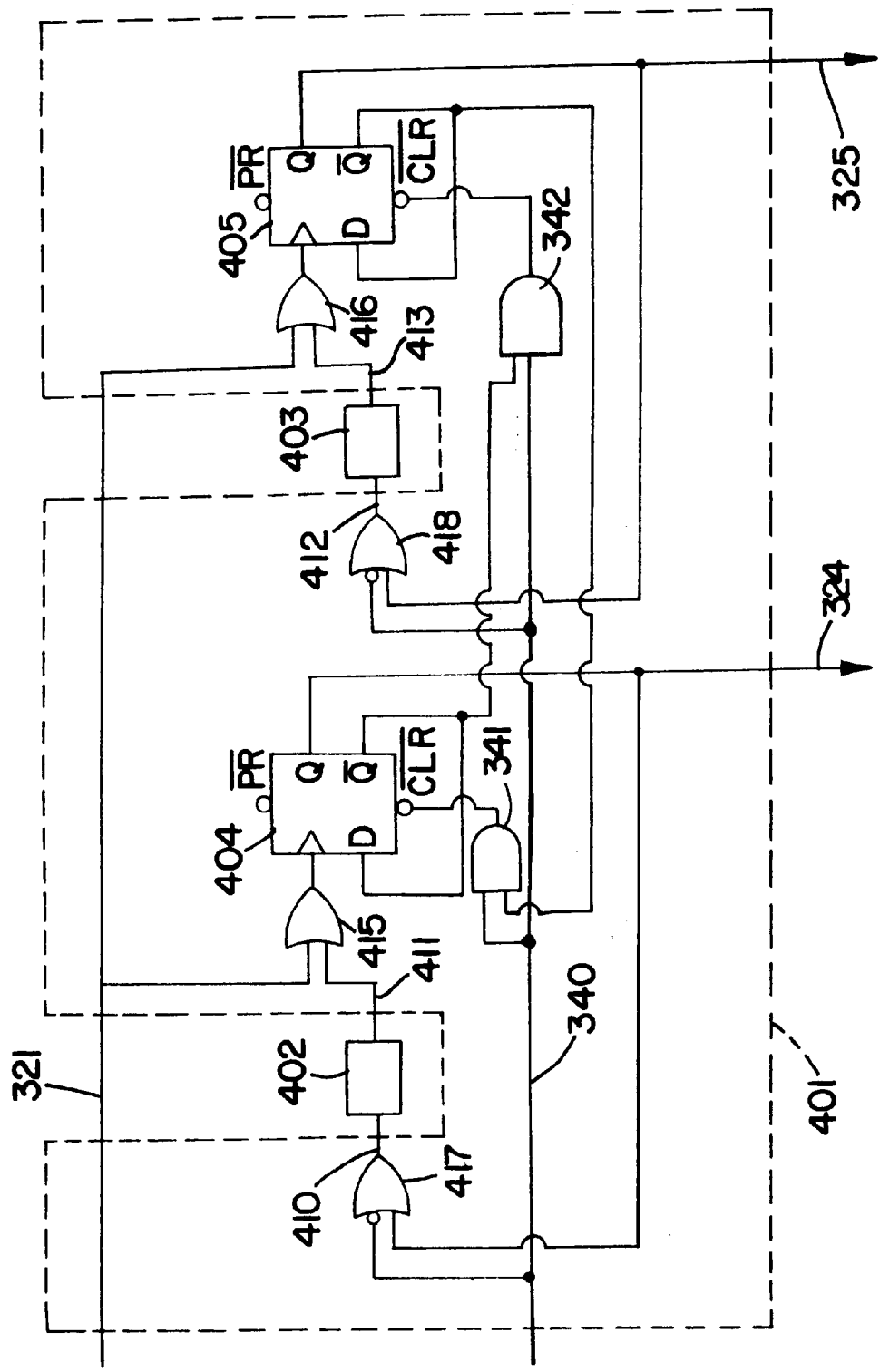

To illustrate one example of implementing the above described second preferred embodiment, referring to FIG. 12, a first D flip-flop 404 activates a first beam synchronization modulation signal in a first synchronization modulation line 324 in response to a completion signal outputted by a first counter 402 and inputted into the first D flip-flop 404 via an OR gate 415. Similarly, a second D flip-flop 405 activates a second beam synchronization modulation signal in a second synchronization modulation line 325 in response to a completion signal outputted by a second counter 403 and inputted into the second D flip-flop 405 via an OR gate 416. The first and second D flip-flops 404 and 405 respectively deactivate the activated first and second synchronization modulation signals in response to a photosensor detection output signal which is inputted to the D flip-flops 404 and 405 via a photosensor output line 321 and the corresponding OR gate 415 or 416. The reversed output Q bar of the first D flip-flop 404 is outputted to a clear pin CLR of the second D flip-flop 405 via an AND gate 342 while the reversed output Q bar of the second D flip-flop 405 is outputted to a clear pin CLR of the first D flip-flop 404 via another AND gate 341. Furthermore, a reset line 340 is connected to the AND gates 341 and 342. Since a reset signal is low active, the above described portion of the circuit prevents one of the flip-flop 404 or 405 from being triggered unless it is being reset by the reset line 340 or the other flip-flop outputs a synchronization modulation signal. The counters 402 and 403 is initialized by either a clear or reset line 340 or the corresponding synchronization signal via a corresponding NOR gate 417 or 418. In addition, although not illustrated in the drawing, each of the counters 402 and 403 has either an independent externally or internally supplied clock source.

Figure 13:
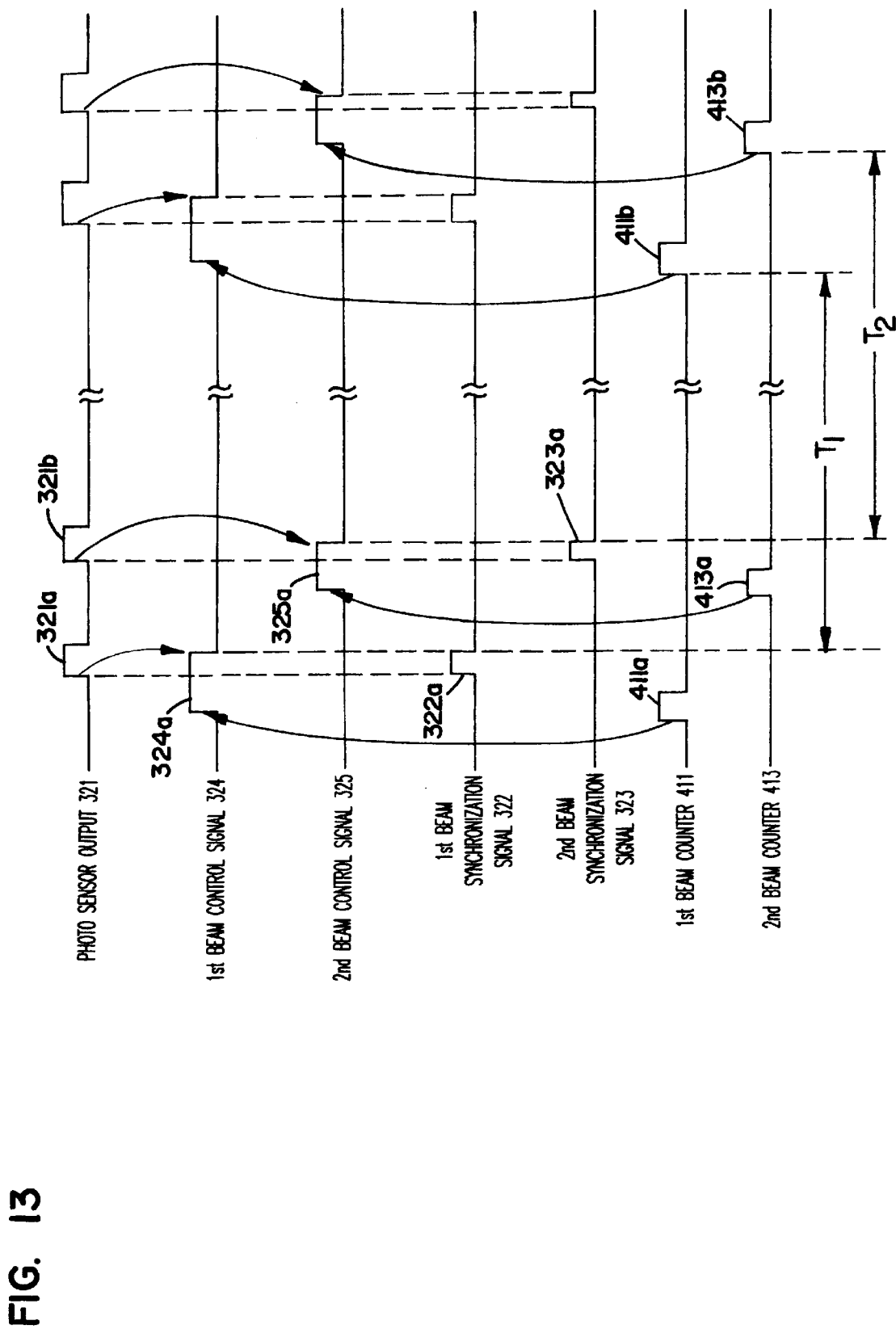
FIG. 13 is a timing chart illustrating the operations of the second preferred embodiment.

FIG. 13 is a timing chart for illustrating the operation of the above described embodiment. In response to a first beam counter completion signal 411, a first beam control signal or a first synchronization modulation signal 324a is activated. During the first beam control signal activation, when a first photosensor detection signal 321a is generated, as a result of the logically ANDing the above two signals, a first beam synchronization signal 322a is generated. The first beam control signal 324a is deactivated in response to the first beam synchronization signal 322a, and at the same time, a first counter is initiated for timing a predetermined amount of time $T_1$. In general, the first predetermined amount of time $T_1$ allows the first beam to complete one line of the image formation. Similarly, in response to a second beam counter completion signal 413, a second beam control signal or a second synchronization modulation signal 325a is activated. During the second beam control signal activation, when a second photosensor detection signal 321b is generated, as a result of the logically ANDing the above two signals, a second beam synchronization signal 323a is generated. The second beam control signal 325a is deactivated in response to the second beam synchronization signal 323a, and at the same time, a second counter is initiated for timing a predetermined amount of time $T_2$. In general, the second predetermined amount of time $T_2$ allows the second beam to complete one line of the image formation, and these two durations of the predetermined amount of time are independently selected, adjusted as well as timed. Upon independently completing the predetermined amount $T_1$ or $T_2$, a corresponding counter completion signal 411b or 413b is generated and the above described sequence of events are repeated for each of the beam.

Figure 14:
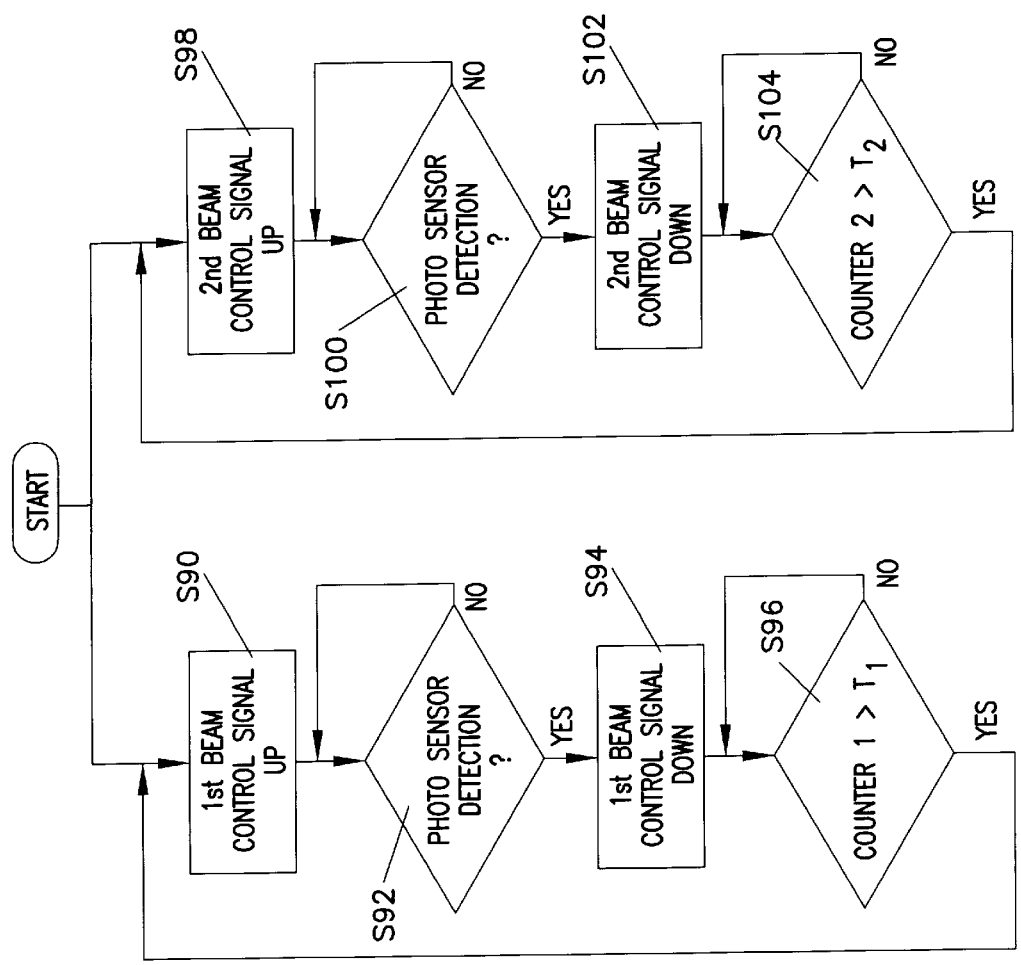
FIG. 14 is a flow chart illustrating steps performed by the second preferred embodiment.

Referring to FIG. 14, the above described independent time tracking activities for each light beam control is illustrated in a flow chart. In a step S90, a first beam control signal or a first beam synchronization modulation signal is activated. In a step S92, while the first beam control signal is up, it is determined in a step S92 whether a photosensor detection of a first light beam takes place. Following the photosensor detection of the first light beam, a first beam synchronization signal is activated as a result of logically ANDing the first beam control signal and the photosensor detection signal in a step S94. In response to the first beam synchronization signal, the first beam control signal is deactivated in a step S94. The above described steps S90 through S94 are now repeated when a first counter completes a predetermined amount of time $T_1$ in a step S96.

Still referring to FIG. 14, independent of the first beam related steps, in a step S98, a second beam control signal or a second beam synchronization modulation signal is activated. In a step S100, while the second beam control signal is up, it is determined in a step 100 whether a photosensor detection of a second light beam takes place. Following the photosensor detection of the second light beam, a second beam synchronization signal is activated as a result of logically ANDing the second beam control signal and the photosensor detection signal in a step S100. In response to the second beam synchronization signal, the second beam control signal is deactivated in a step S102. Following the step 102, the second synchronization signal itself is also deactivated in a step S102. The above described steps S98 through S102 are now repeated when a second counter completes a predetermined amount of time $T_2$ in a step S104.

Figure 15:
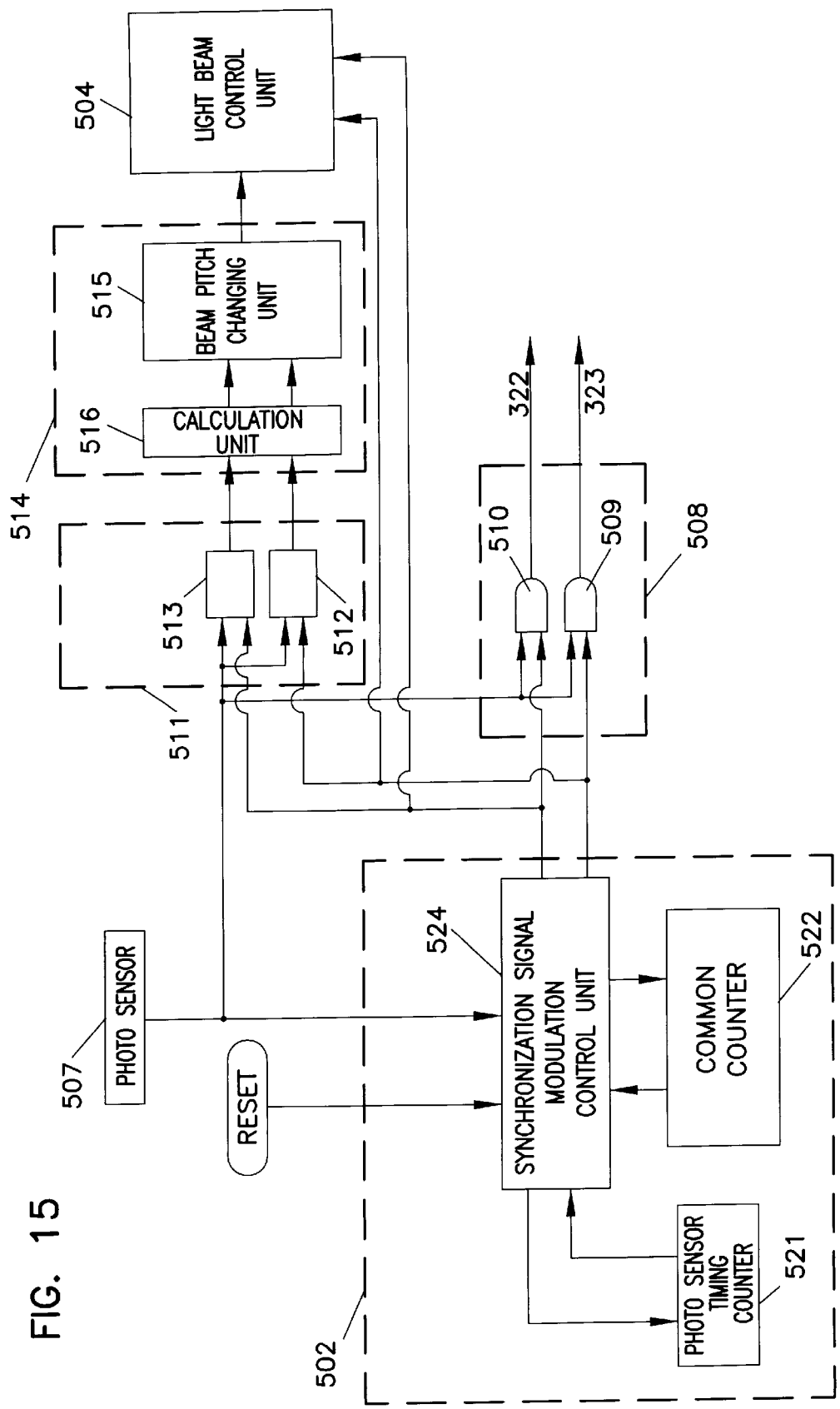
FIG. 15 is a block diagram illustrating a third preferred embodiment of the multiple beam synchronization system according to the current invention.

Referring to FIG. 15, a third preferred embodiment of the multiple beam synchronization system according the current invention not only ascertains the synchronization but also adjusts a scanning pitch between the multiple beams. The multiple beam synchronization system includes a synchronization signal modulation unit 502, a synchronization signal generation unit 508, a photosensor output timing unit 511, a pitch adjustment unit 514, and a photosensor 507. The synchronization signal modulation unit 502 further includes a common counter 522, a photosensor timing counter 521 and a synchronization signal modulation control unit 524. As described above in referenced to FIGS. 7 and 11, in response to a counter completion signal 1111, the synchronization signal modulation control unit 524 outputs a respective synchronization modulation signal or beam control signal to a synchronization signal generation unit 508 as well as a light beam control unit 504 for directly and independently controlling the onset of each light beam. The synchronization signal generation unit 508 further includes a pair of AND gates 509 and 510 for confirming the photosensor detection signal based upon the synchronization modulation signals so as to generate confirmation or synchronization signals 322 and 323.

Still referring to FIG. 15, in addition to the above described components for confirming the synchronization of the multiple beams, the synchronization modulation signals are also used to adjust a pitch between the beams. In order to adjust the pitch, in general, the photosensor output timing unit 511 determines a time for each of the two scanning beams to travel over a predetermined distance over a photosensor 507 and the pitch adjustment unit 514 adjusts the pitch based upon the above determined time. The photosensor output timing unit 511 further includes a first timing element 512 and a second timing element 513 for individually timing the amount of time that each light beam travels over the photosensor 507 while the corresponding synchronization signal is active. In this regard, the photosensor timing counter 521 in the synchronization signal modulation unit 502 ascertains a sufficient predetermined amount of time for each of the synchronization modulation signals to stay activated so that the first and second timing elements measure an entire duration of the light beam travel over the photosensor 507. The photosensor timing counter 521 deactivates the synchronization modulation signal only after the predetermined amount of time. The pitch adjustment unit 514 also further includes a calculation unit for converting the above measured time into a distance and a beam pitch changing unit 515 for changing the pitch between the beams.

Figure 16:
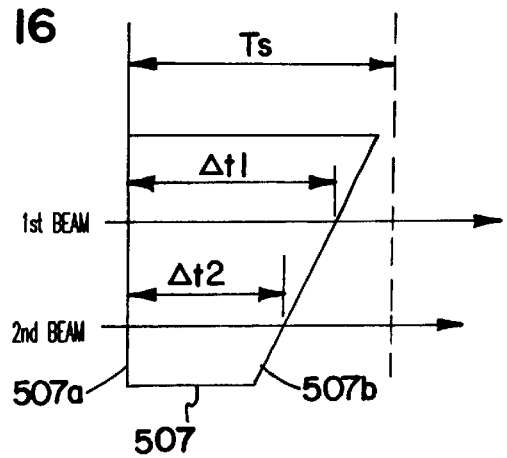
FIG. 16 is a top view illustrating one exemplary shape of a photosensor.

Now referring to FIG. 16, one example of the above described photosensor 507 is illustrated in a top view. This exemplary photosensor strip 507 has a trapezoidal shape; a first edge 507a that is vertical to a light path of a first light beam and a second light beam while a second edge 507b is angled at a predetermined angle with respect to the light path. Assuming the same velocity for the scanning light beams, it takes the first beam $\Delta t_1$ while it takes the second beam $\Delta t_2$ to complete the travel over the photosensor surface 507. One example of the above described sufficient predetermined amount of time for the activated synchronization modulation signals is indicated as Ts.

Figure 17:
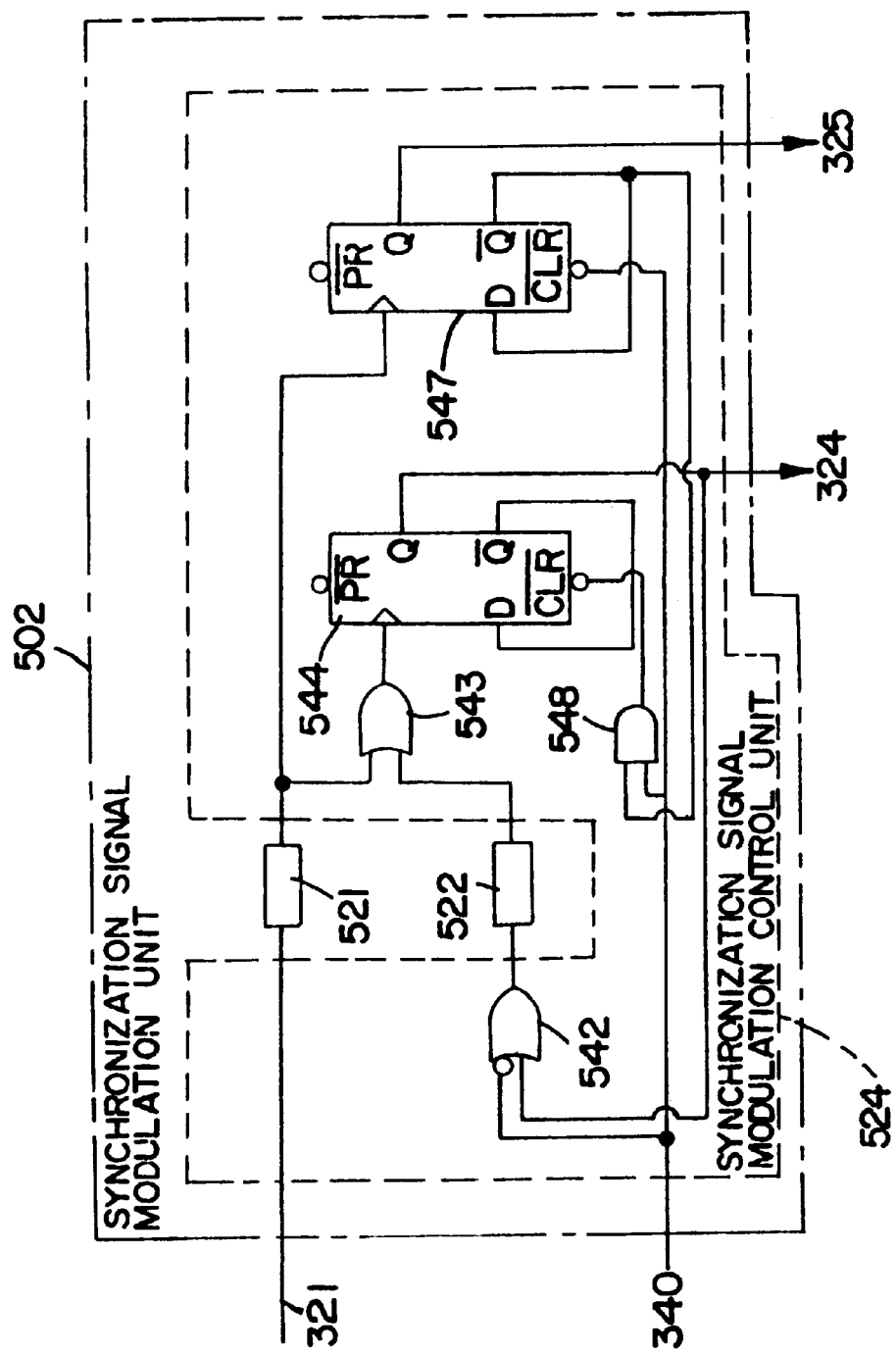
FIG. 17 is a circuit diagram illustrating one exemplary implementation of some units in the third preferred embodiment.
Figure 17A:
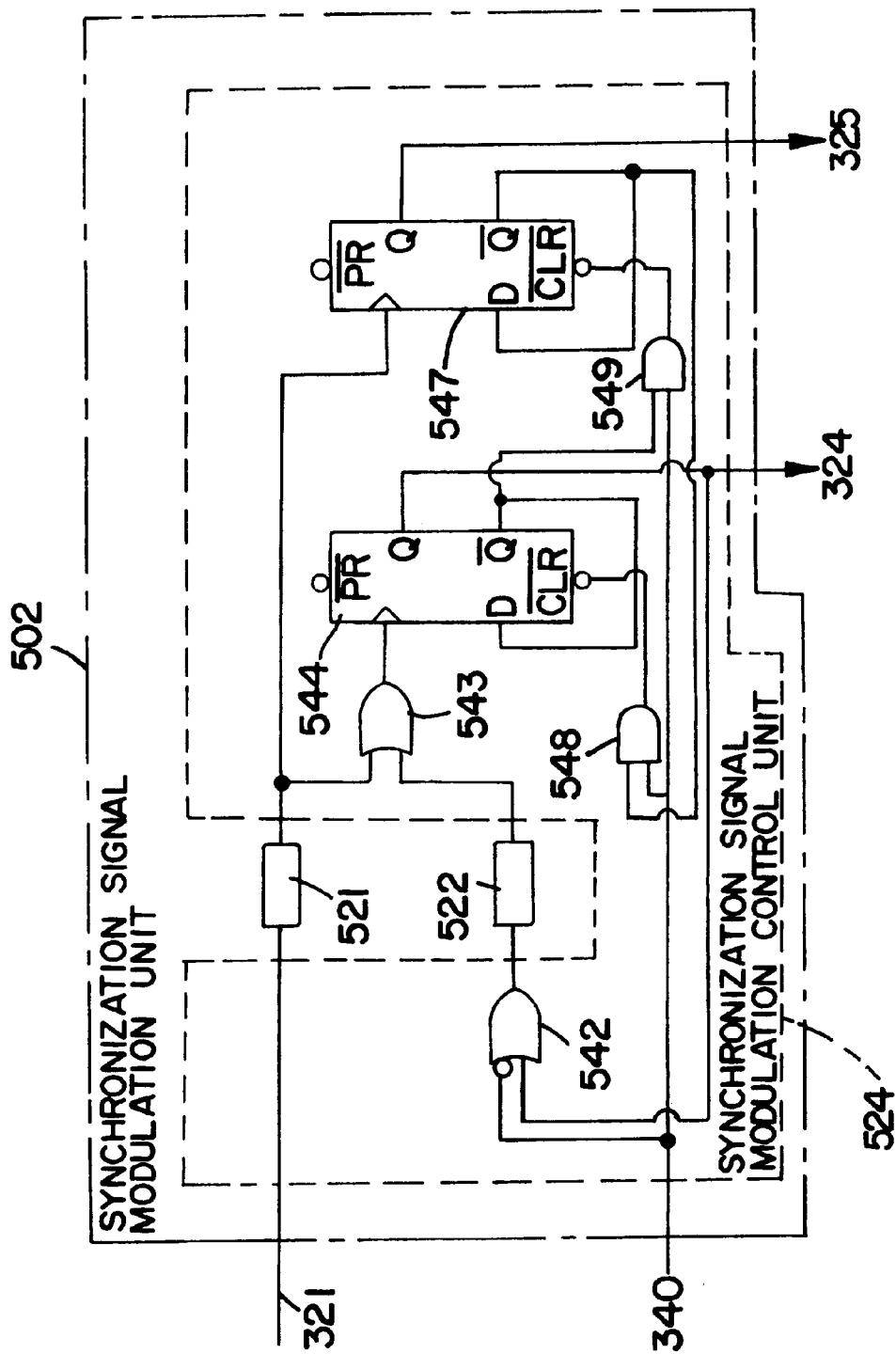

Referring to FIG. 17, to illustrate one example of implementing the above described third preferred embodiment, a first D flip-flop 544 activates a first beam synchronization modulation signal in a first synchronization modulation line 324 in response to a completion signal outputted by a first counter 522 and a photosensor timing signal outputted by a photosensor timing counter 521 both of which are inputted into an OR gate 543. Similarly, a second D flip-flop 547 activates a second beam synchronization modulation signal in a second synchronization modulation line 325 in response to a photosensor counter 521. The first and second D flip-flops respectively deactivate the activated first and second synchronization modulation signals after a predetermined amount of time has elapsed. The reversed output Q bar of the second D flip-flop 547 is outputted to a clear pin CLR of the first D flip-flop 544 via an AND gate 548. Since a reset signal 340 is low active, this portion of the circuit prevents one of the flip-flop 544 or 547 from being triggered unless it is being reset by the reset line 340 or the other flip-flop outputs a synchronization modulation signal. The counter 522 is initialized by either a clear or reset line 340 or the corresponding synchronization signal via a NOR gate 542.

Figure 18:
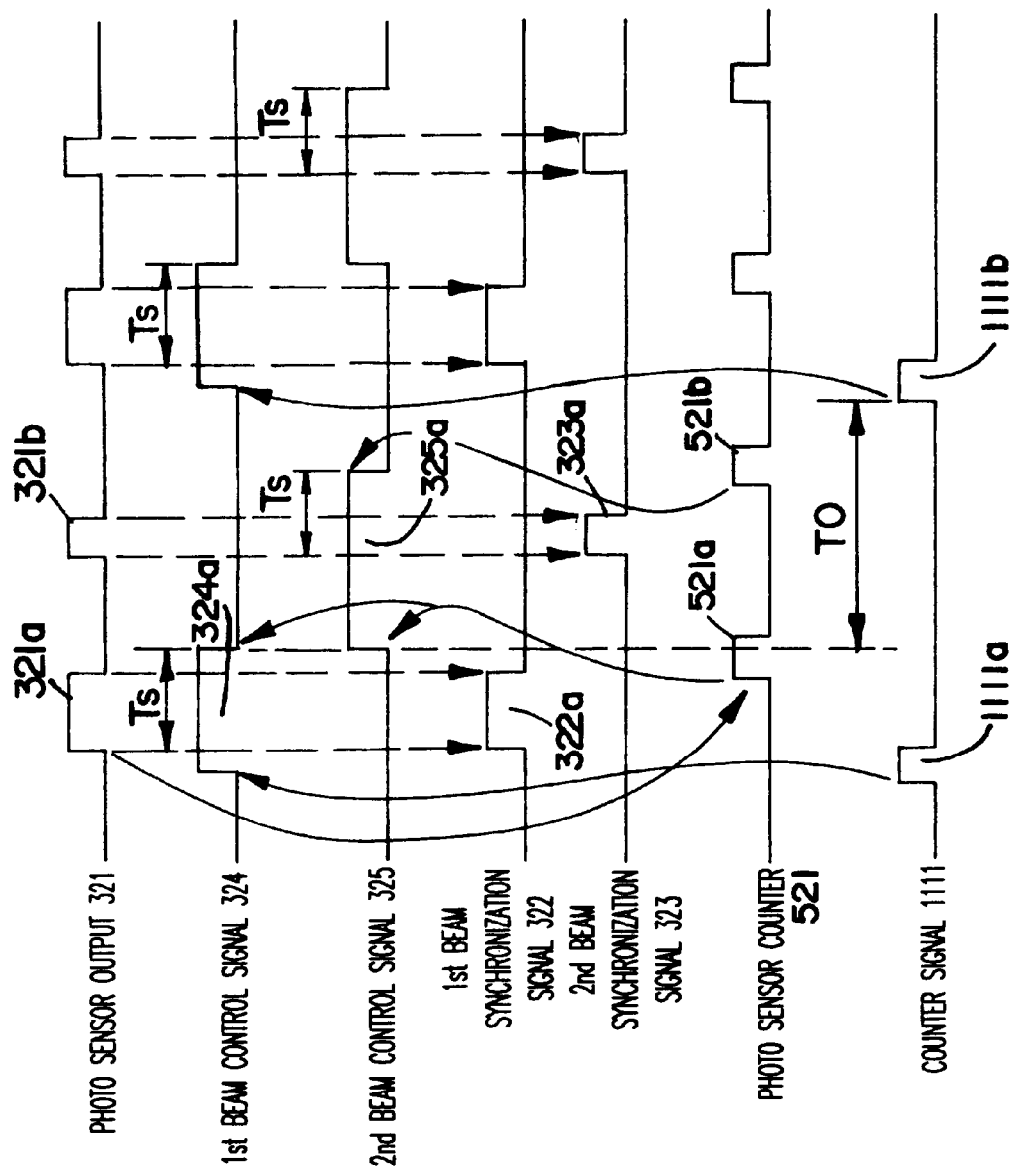
FIG. 18 is a timing chart illustrating the operations of the third preferred embodiment.

Referring to FIG. 18, a timing chart illustrates the operation of the above described third preferred embodiment of the multiple beam synchronization system according to the current invention. In response to a counter completion signal 1111a, a first beam control signal or first beam synchronization modulation signal 324a is activated as indicated by an arrow. The activation timing of the first beam synchronization modulation signal is set prior to an expected arrival of the first beam at a photosensor location so that the activation timing allows a sufficient amount of margin for some variations. During the onset period of the first beam control or synchronization modulation signal 324a, a photosensor detection output or photosensor output signal 321a is activated for detecting the first light beam. As a result of the simultaneous onset of the 1st beam control signal 324a and the photosensor output signal 321a, a first beam synchronization signal 322a is generated. In addition, the photosensor output signal 321a triggers the photosensor counter, and until the photosensor counter reaches an end of a predetermined period Ts, the first synchronization modulation signal 324a is kept activated. Upon completion of a predetermined period of Ts, a photo sensor timing signal 521a is generated for deactivating the first beam control signal 324a as well as activating a second beam control signal or a second beam synchronization modulation signal 325a. Either a falling edge of the first beam control signal 324a or a rising edge of the second beam control signal 325a initiates a common counter. Upon completing a predetermined time $T_0$, a second counter completion signal 1111b is generated, and the above described sequence of the events is repeated.

Still referring to FIG. 18, similarly, the activation timing of the second beam synchronization modulation signal is set prior to an expected arrival of the second beam at a photosensor location so that the activation timing allows a sufficient amount of margin for some variations. A second photosensor output signal 321b is generated for detecting the second beam. As a result of the simultaneous onset of the second beam control signal 325a and the photosensor output signal 321b, a second beam synchronization signal 323a is generated. The second photosensor output signal 321b also initiates the photosensor counter. Until the photosensor counter reaches an end of a predetermined period Ts, the second synchronization modulation signal 325a is kept activated. Upon completion of a predetermined period of Ts, a photo sensor timing signal 521b is generated for deactivating the second beam control signal 325a. Based upon the above determined first and second synchronization signals 322a and 323a, as described above, the time difference between these signals is used to adjust a pitch between the two light beams.

Figure 19:
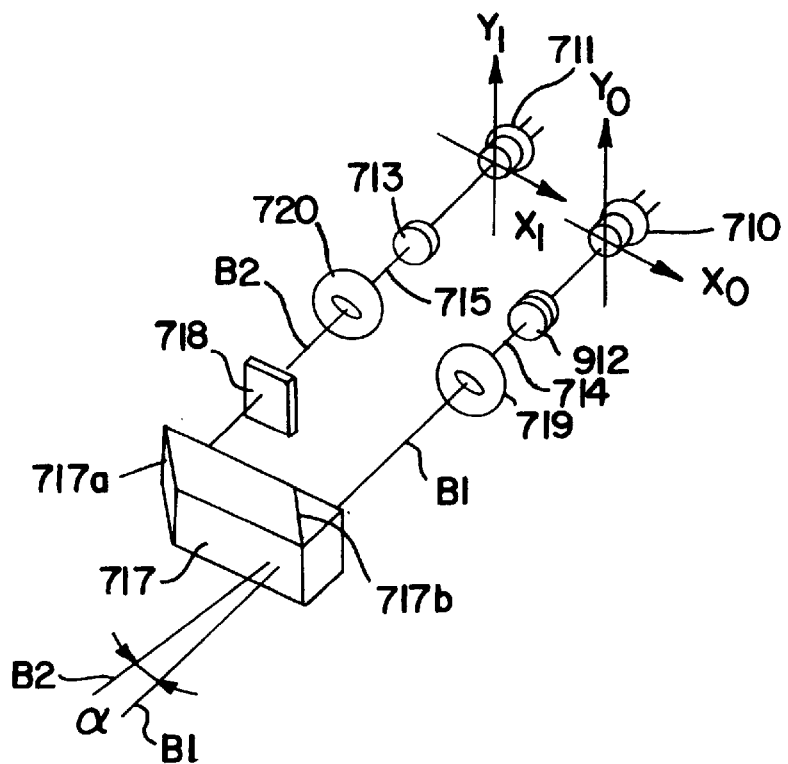
FIG. 19 is an extended perspective of a rotatable light beam source unit used in the third and fourth preferred embodiments.

Now referring to FIGS. 19, to adjust the pitch between the light beams, one example of a rotatable light housing unit houses a plurality of light sources and includes a pair of light emitting elements 710 and 711 such as laser diodes is placed in an array, and the center of each light emitting diode 710, 711 is indicated by an origin of the XY axes. The two pairs of XY axes (X0,Y0 and X1,Y1) are at least parallel to each other, and the X axes may be coinciding on the same line. Each of the light emitting elements 710 and 711 respectively projects light in the direction perpendicular to a respective X-Y plane through its origin towards a corresponding collimator lens 712 or 713. The collimator lenses 712 and 713 convert the emitted light into substantially parallel arrays of light 714 and 715, and the parallel beams 714 and 715 enter respective an aperture 720 and 719. After exiting the apertures 719 and 720, a beam B2 enters into a ½ wave plate 718 for altering a plane of polarization by 90 degrees. The beam B2 then enters a prism 717 and reflected by an internal surface 717a and a beam splitter reflecting surface 717b before exiting the prism 717. On the other hand, the beam B1 enters the beam splitter 717b in the prism 717 from the opposite side and exits the prism 717 without being reflected. As a result, the beams B1 and B2 are placed substantially close with each other, and the angle formed by optical axes of the beams B1 and B2 is a predetermined angle α, which is caused by an amount of eccentricity between the laser diode 711 and the collimator lens 713.

Figure 20:
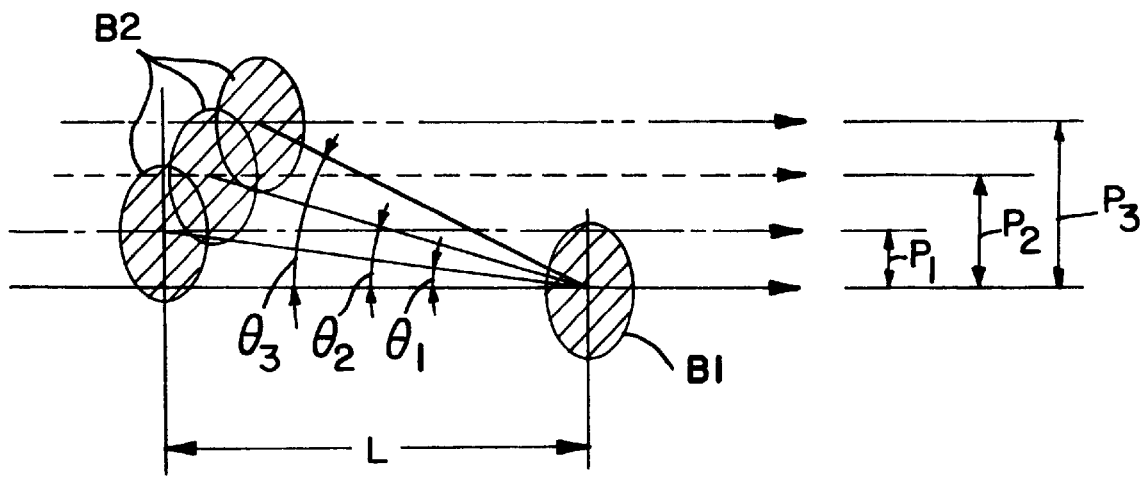
FIG. 20 is a diagram illustrating how the rotatable light source unit adjusts a scanning pitch between the beams.

Now referring to FIG. 20, when the above described rotatable housing unit is rotated along a light-emitting axis of the beam B1, the sub-scanning pitch or the vertical distance between the two beams B1 and B2 is varied depending upon the position of beam B2 with respect to that of beam B1. In other words, the sub-scanning pitch is $P_1$ when the beam B2 is positioned at $\theta_1$ with respect to the beam B1 in the scanning direction. Similarly, the sub-scanning pitch is $P_2$ when the beam B2 is positioned at $\theta_2$ while the sub-scanning pitch is $P_3$ when the beam B2 is positioned at $\theta_3$. Both beams B1 and B2 are scanned in a predetermined scanning direction as indicted in arrows, and the horizontal distance or a scanning pitch at the sub-scanning pitch of $P_1$ is shown as L. Thus, based upon the above determined synchronization signals, the time difference between these signals is converted into a sub-scanning distance between the beams, and the sub-scanning pitch is adjusted to a desired distance by rotating the rotatable light source housing unit.

Figure 21:
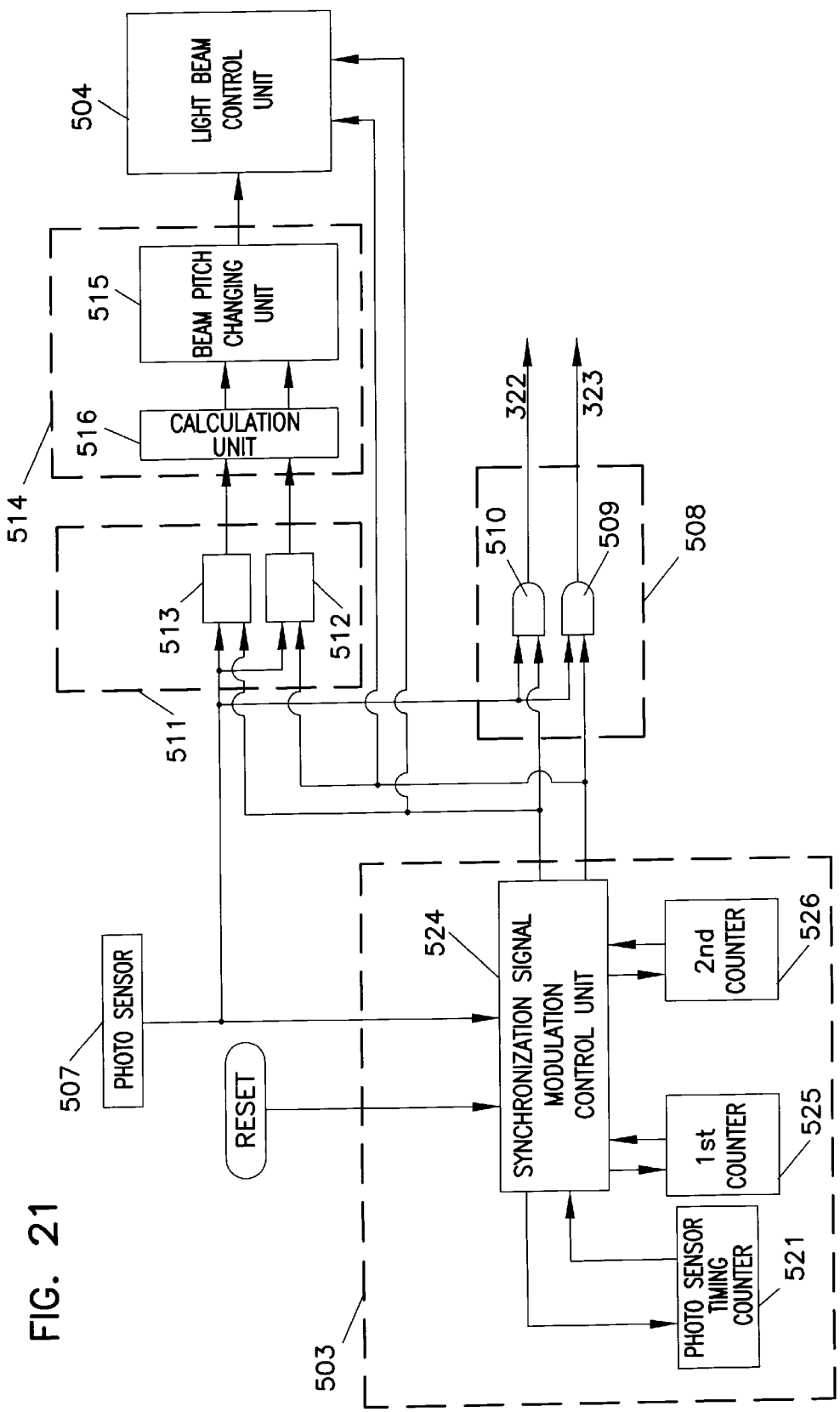
FIG. 21 is a block diagram illustrating a fourth preferred embodiment of the multiple beam synchronization system according to the current invention.

Now referring to FIG. 21, a fourth preferred embodiment of the multiple beam synchronization system according the current invention also confirms the synchronization of the multiple beams as well as adjusts the sub-scanning pitch between the beams. In general, the fourth preferred embodiment includes substantially identical units which have been described for the third preferred embodiment in reference to FIG. 15. However, the fourth embodiment includes a synchronization signal modulation unit 503 which further includes a pair of independent first and second counters 525 and 526 for timing a separate predetermined time. The independent counters 525 and 526 enable a synchronization signal modulation control unit 524 to generate sequentially overlapping synchronization modulation signals.

Figure 22:
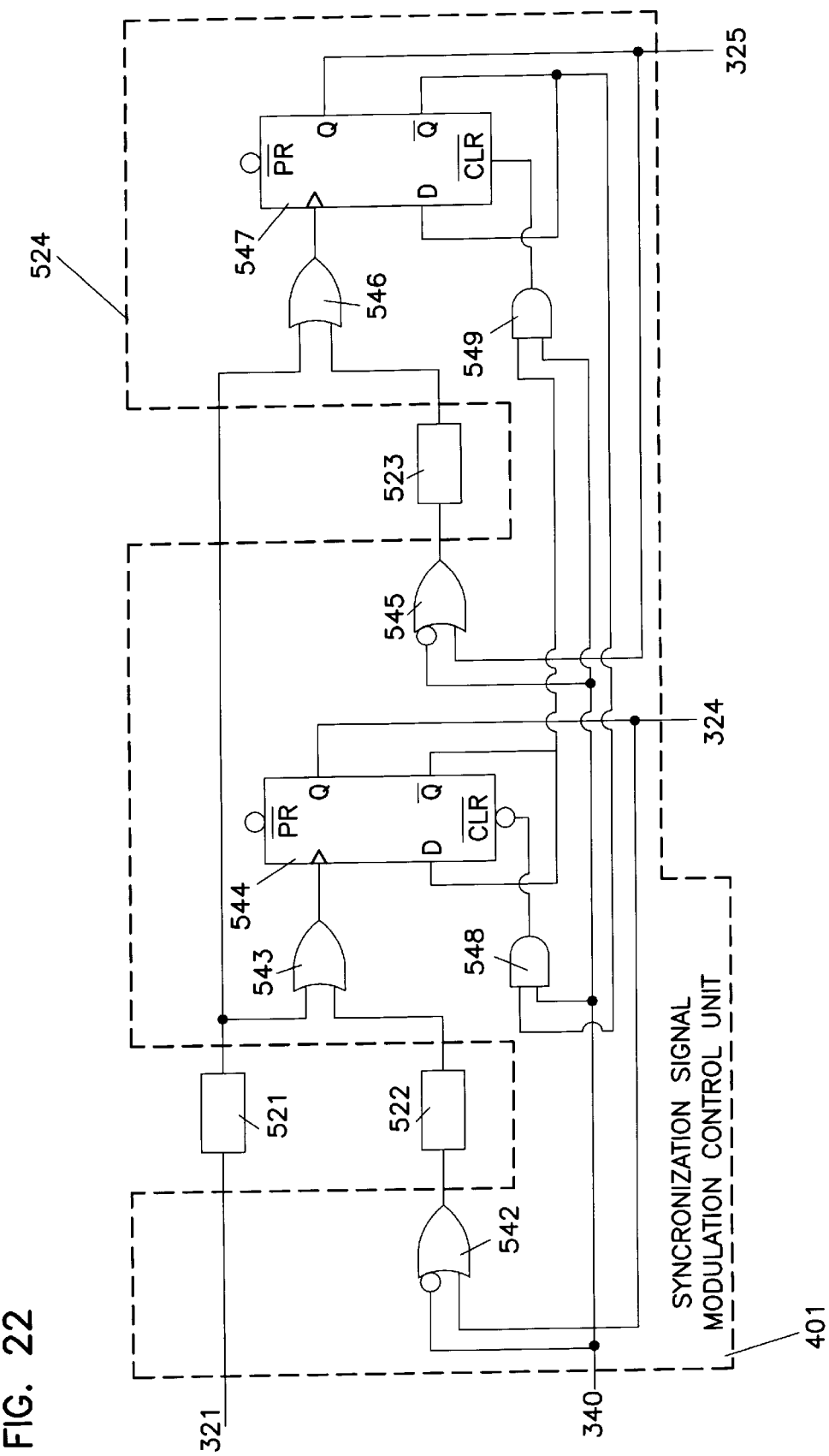
FIG. 22 is a circuit diagram illustrating one exemplary implementation of some units in the fourth preferred embodiment.

Referring to FIG. 22, to illustrate one example of implementing the above described fourth preferred embodiment, a first D flip-flop 544 activates a first beam synchronization modulation signal in a first synchronization modulation line 324 in response to a completion signal outputted by a first counter 522 and a photosensor timing signal outputted by a photosensor timing counter 521 both of which are inputted into the D latch flip-flop 544 via an OR gate 543. Similarly, a second D flip-flop 547 activates a second beam synchronization modulation signal in a second synchronization modulation line 325 in response to the photosensor timing counter 521. In other words, the first and second D flip-flops 544 and 547 respectively deactivate the activated first and second synchronization modulation signals after a predetermined amount of time has elapsed. The reversed output Q bar of the first D flip-flop 544 is outputted to a clear pin CLR of the second D flip-flop 547 via an AND gate 549 while the reversed output Q bar of the second D flip-flop 547 is outputted to a clear pin CLR of the first D flip-flop 544 via another AND gate 548. This part of the circuit prevents one of the flip-flop 544 or 547 from being triggered unless it is being reset by the reset line 340 or the other flip-flop outputs a synchronization modulation signal. The counter 522 is initialized by either a clear or reset line 340 or the corresponding synchronization signal via a NOR gate 542.

Figure 23:
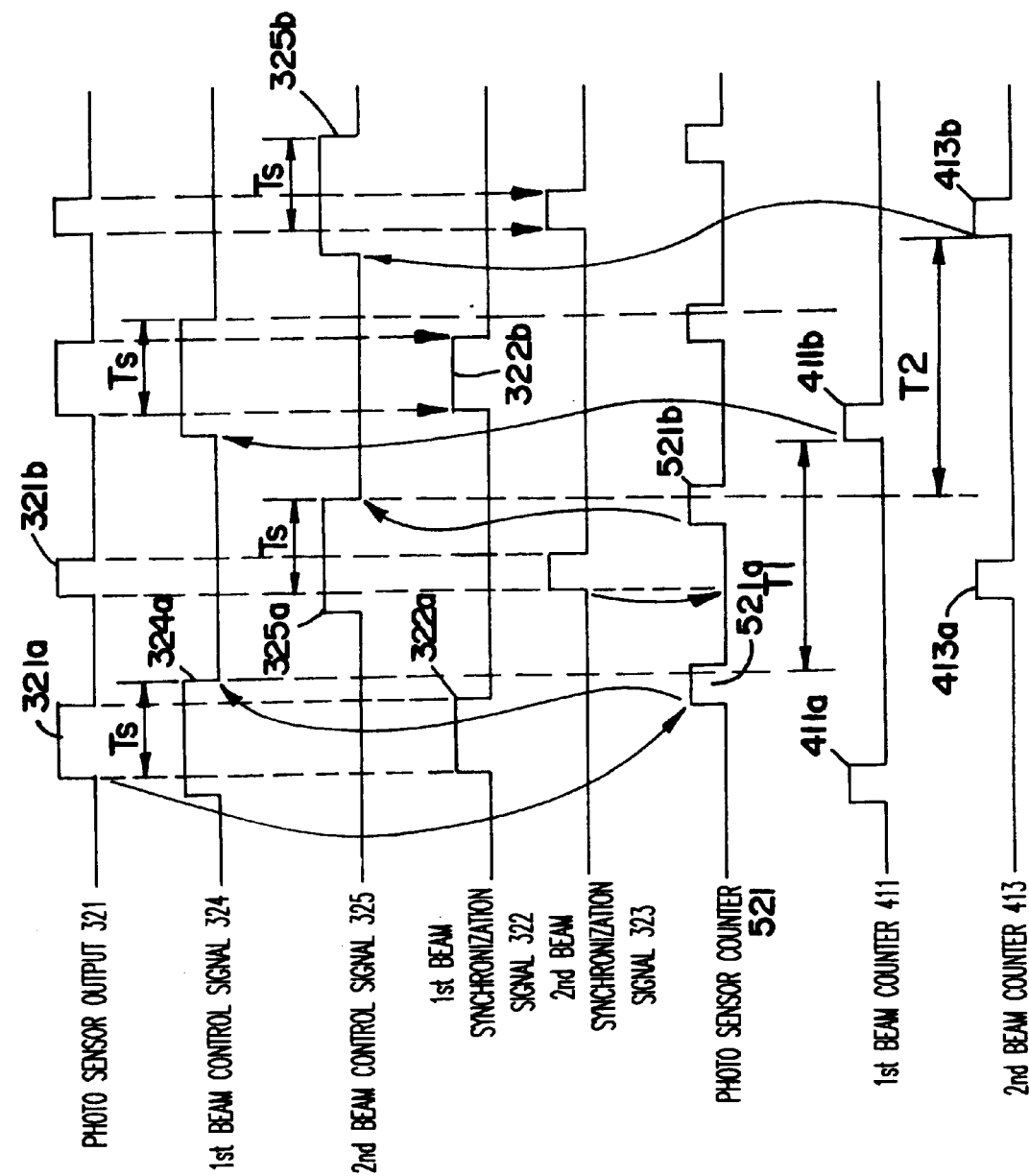
FIG. 23 is a timing chart illustrating the operations of the fourth preferred embodiment.

Referring to FIG. 23, a timing chart illustrates the operation of the above described fourth preferred embodiment of the multiple beam synchronization system according to the current invention. In general, the timing chart is essentially the same as one described for the third preferred embodiment in reference to FIG. 18. However, a first beam counter signal 411 and a second beam counter signal 413 are independently initiated, and because of these independent signals, a first beam control signals 324 and a second beam control signal 325 are also independently activated. In particular, a falling edge of a first beam control signal 324a at the end of a predetermined time Ts initiates a first beam counter for timing a predetermined time $T_1$, and at the end of the predetermined time $T_1$, a first beam counter completion signal 411b activates a first beam control signal 324b. Similarly, a falling edge of a second beam control signal 325a at the end of a predetermined time Ts initiates a second beam counter for timing a predetermined time $T_2$, and at the end of the predetermined time $T_2$, a second beam counter completion signal 413b activates a second beam control signal 325b. Thus, because of the independent counters, the predetermined time $T_1$ and $T_2$ may be sequentially overlapping.

Figure 24:
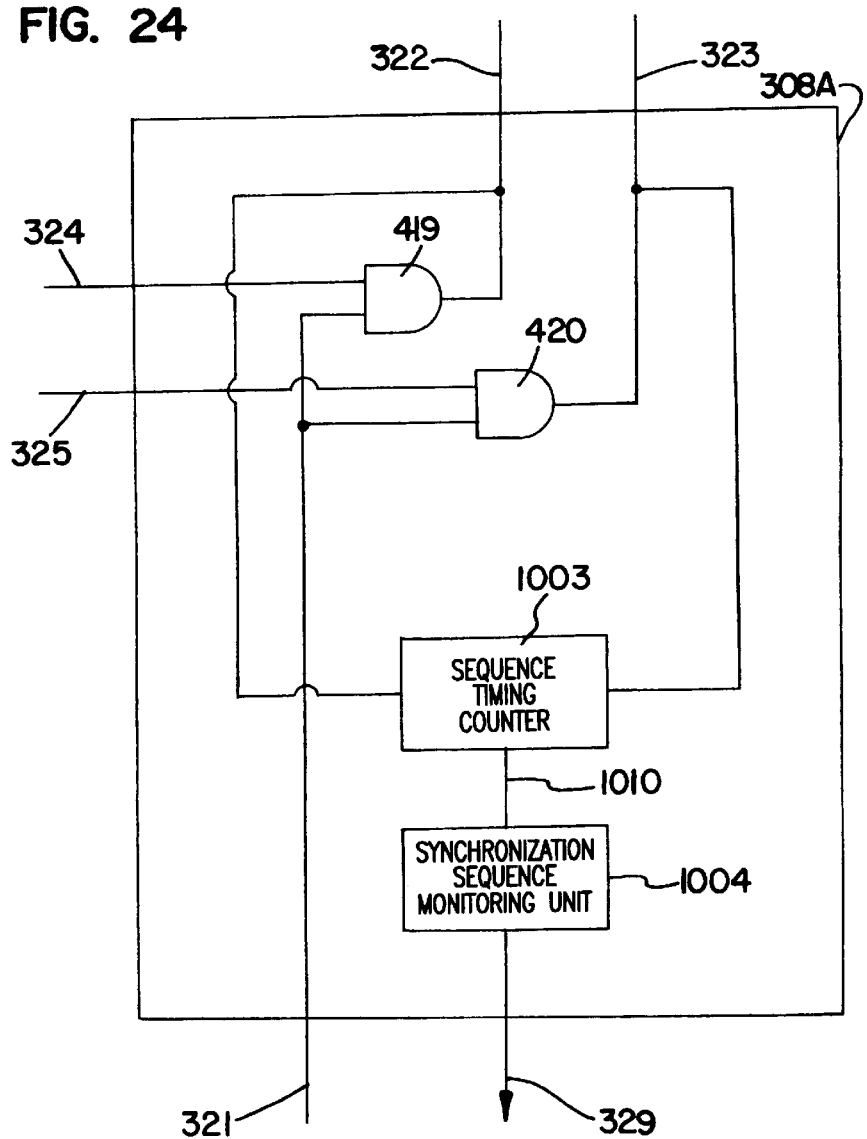
FIG. 24 is a block diagram illustrating more detailed aspects of an image synchronization signal generation unit in the fifth preferred embodiment according to the current invention.

Referring to FIG. 24, in order to further increase the accuracy of the synchronizing process of the multiple beams, a fifth embodiment of the synchronization signal generation unit according to the current invention is illustrated. A synchronization signal generation unit 308A includes two AND gates for logically ANDing a photoreceptor output signal line 321 and respective synchronization modulation signal lines 324 and 325 in order to ascertain a correct confirmation signal via respective synchronization signal lines 322 and 323. In addition to the above described circuitry, the synchronization signal generation unit 308A additionally includes a sequence timing counter 1003 and a synchronization sequence monitoring unit 1004. In general, the sequence timing counter 1003 initiates a counting process upon a rising edge of the first beam synchronization signal 322 and terminates the counting process upon a falling edge of the second beam synchronization signal 323. Based upon the time measured by the sequence timing counter 1003, the synchronization sequence monitoring unit 1004 verifies whether the first beam synchronization signal is correctly generated. Upon determining an invalid first beam synchronization signal, the synchronization sequence monitoring unit 1004 generates an invalid signal in an invalid line 329.

Figure 25:
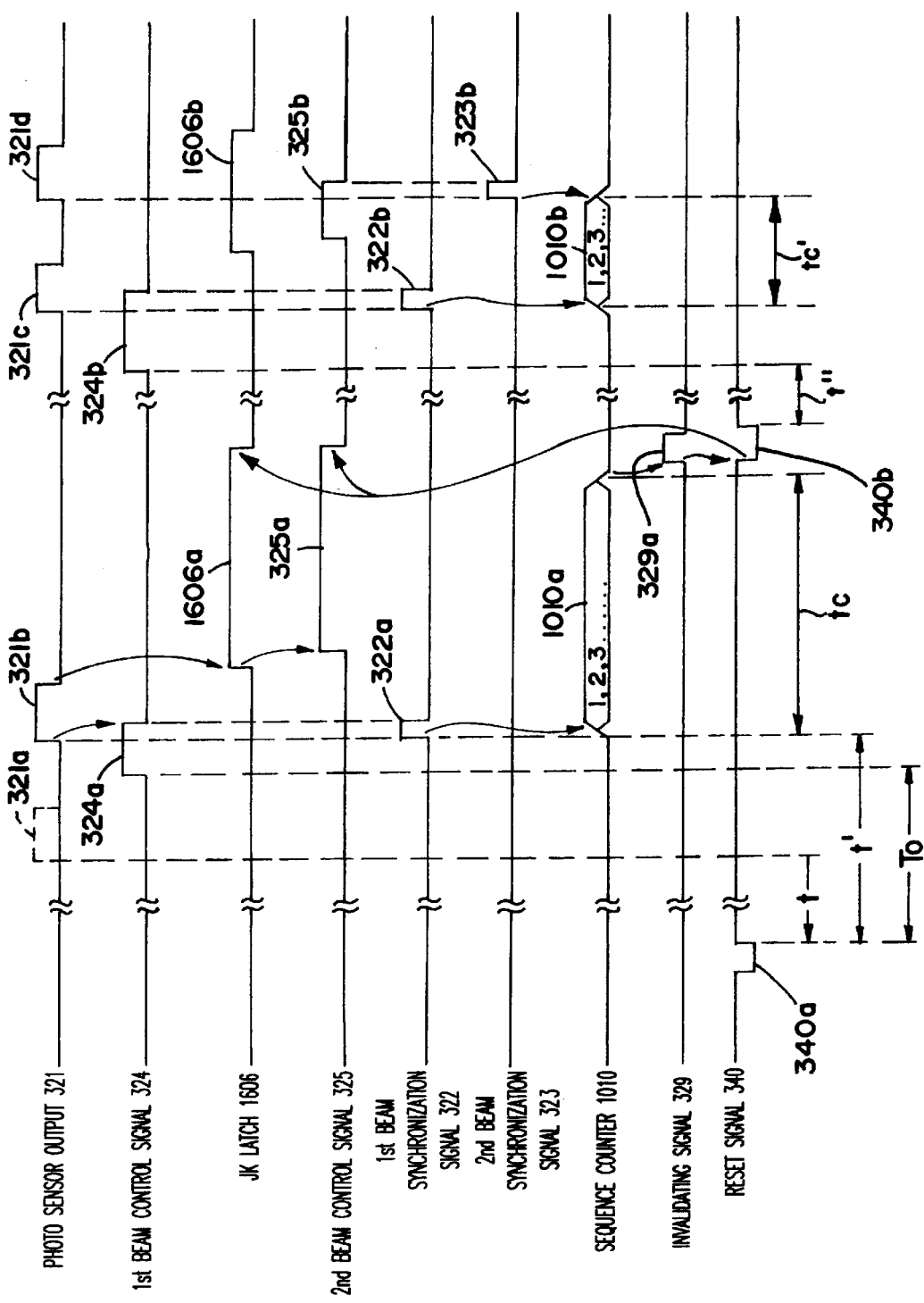
FIG. 25 is a timing chart illustrating the operations of the fifth preferred embodiment.

To further describe the invalidity determination of a first beam synchronization signal, referring to FIG. 25, a timing chart is provided for the fifth preferred embodiment according to the current invention. In general, when a multiple beam synchronization system is initially activated, a reset signal 340a is generated to synchronize its timing process. Although a photosensor output signal for a first beam should have generated after a predetermined time t following a rising edge of the reset signal 340a, due to various reasons, the first beam control signal 324a is generated after a time $T_0$ following a rising edge of the reset signal 340a, and the photosensor output signal is generated at the time t'. Similarly, a first synchronization signal 322a is also generated after a time t' following the rising edge of the reset signal 340a. A rising edge of the synchronization signal 322a initiates a sequence counter signal 1010a, but the activated sequence counter signal 1010a is not deactivated by a falling edge of the second beam synchronization signal 323. Instead, the activated sequence counter signal 1010a is deactivated by an invalidating signal 329a which leads to activate another reset signal 340b. The invalidating signal 329a is generated since a duration tc (i.e., generally, a time difference between the first beam control signal and the second beam control signal) is larger than a predetermined value. For example, if a ratio $T_0/tc$ is smaller than a predetermined value "100," an invalidating signal is generated. Lastly, the reset signal 340b deactivates a JK latch signal 1606a as well as a second beam control signal 325a.

Still referring to FIG. 25, following the second reset signal 340b, a first beam control signal 324b is generated after t", and a second photosensor output signal 321c is generated indicative of a first beam's arrival at a photosensor location. As a result of logically ANDing the above two signals, a first beam synchronization signal 322b is generated. Similarly, a second beam control signal 325b is generated, and a third photosensor output signal 321d is generated indicative of a second beam's arrival at a photosensor location. As a result of logically ANDing the above two signals, a second beam synchronization signal 323b is generated. Upon the activation of the first beam synchronization signal 322b, the sequence timing counter signal 1010b is initiated, and upon the activation of the second beam synchronization signal 323b, the sequence timing counter signal 1010b is terminated. Since the time difference tc' in activation of the first and second synchronization signals 322b and 323b is sufficiently small below a predetermined value, no invalidating signal is generated.

Figure 26:
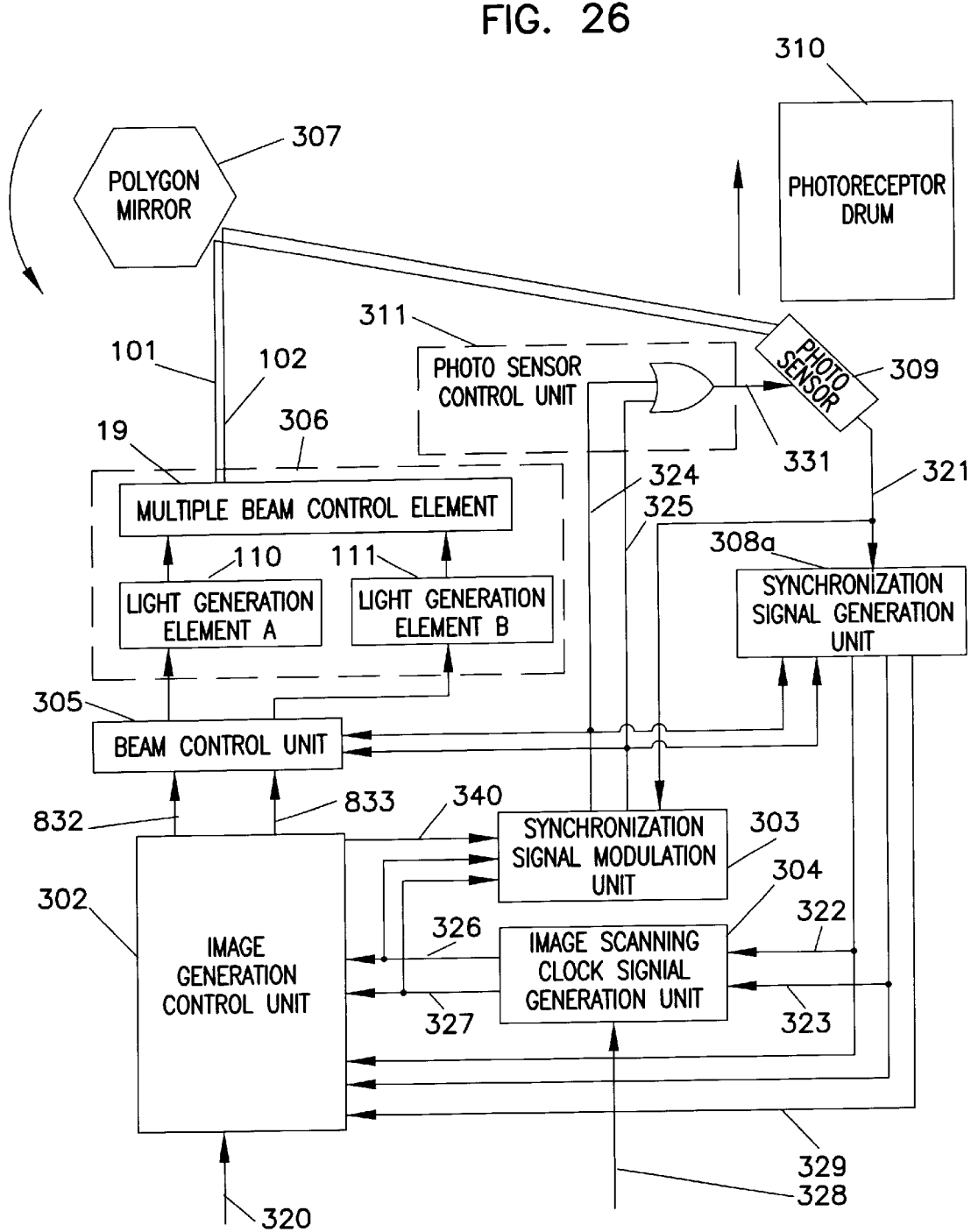
FIG. 26 is a block diagram illustrating a sixth preferred embodiment of the multiple beam synchronization system according to the current invention.

Now referring to FIG. 26, a sixth preferred embodiment of the multiple beam synchronization system according to the current invention is diagrammatically illustrated. Since the sixth preferred embodiment is substantially the same as the first preferred embodiment as shown in FIG. 6, the descriptions of the identically referenced elements are not reiterated here but are incorporated herein from the above. In the sixth preferred embodiment, a photosensor control unit 311, a photosensor unit 309 and a synchronization signal generation unit 308a are unique. In general, the sixth preferred embodiment uses independently generated beam control signals or synchronization modulation signals to individually control light generation elements 110 and 111 as well as control a photosensor unit 309 via a photosensor control unit 311. The independently generated synchronization modulation signals are inputted into the photosensor control unit 311 via respective modulation signal lines 324 and 325. The photosensor control unit 311 enables and disables the photosensor 309 based upon the synchronization modulation signals so as to accurately detect the scanning beams only when they are expected to arrive. One exemplary implementation of the photosensor control unit 311 includes a logical OR gate which receives the synchronization modulation signals and sends the logical output to a photosensor enabling line. The photosensor unit 309 has a capability of enabling and enabling the photo detection based upon the photosensor enabling line input. The synchronization signal generation unit 308a receives the photosensor output signal and the synchronization modulation signals for generating corresponding individual synchronization signals.

Figure 27:
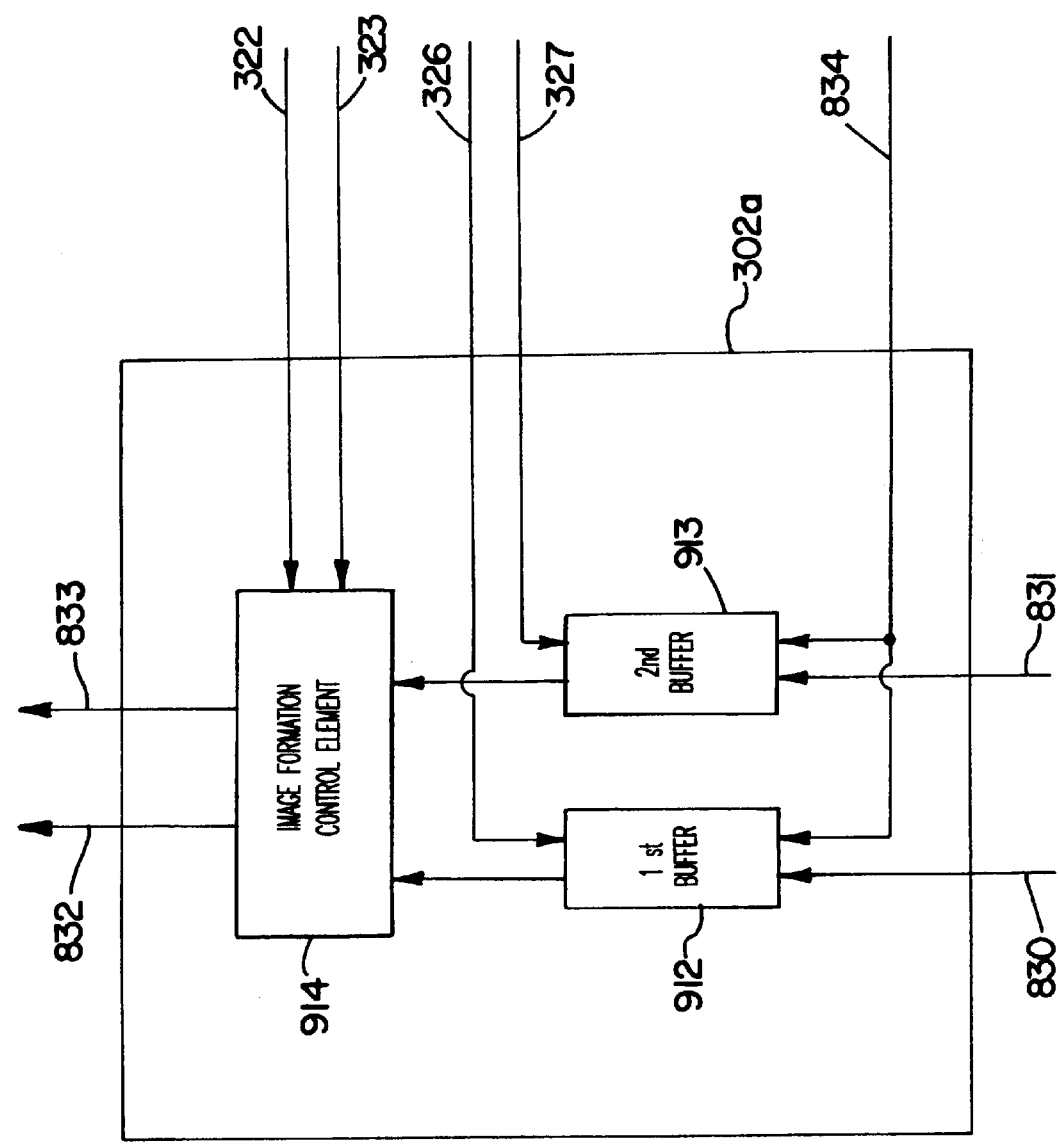
FIG. 27 is a block diagram illustrating more detailed aspects of an image generation control unit.

Now referring to FIG. 27, one exemplary implementation of an image generation control unit 302a includes a first buffer 912 for receiving image data for a first beam and a second buffer 913 for receiving image data for a second beam upon a buffer writing clock signal via a buffer clock line 834. The stored image data in the first and second buffers 912 and 913 is respectively read out to an image formation control element 914 upon corresponding image scanning clock signals via image scanning clock lines 326 and 327. Lastly, synchronization signals 322 and 323 synchronizes the image data transfer from the image formation control element 914 to a beam control unit via a first image writing signal line 832 and a second image writing signal line 833.

The current invention is not limited to the above two light beam image forming system and is practiced with any multiple number of light beams. It is to be understood, however, that even though numerous characteristics and advantages of the present invention have been set forth in the foregoing description, together with details of the structure and function of the invention, the disclosure is illustrative only, and that although changes may be made in detail, especially in matters of shape, size and arrangement of parts, as well as implementation in software, hardware, or a combination of both, the changes are within the principles of the invention to the full extent indicated by the broad general meaning of the terms in which the appended claims are expressed.

What is claimed is:

1. A method of controlling multiple beams emitted towards a photo sensor located outside an image forming surface at a predetermined beam sensing location, each of the multiple beams forming a desired image on the image forming surface in a predetermined scanning direction starting at a predetermined image onset location, comprising:
   a) scanning the multiple beams towards said predetermined beam sensing location;
   b) generating a predetermined number of independent beam control signals;
   c) independently activating each of the multiple beams in response to a corresponding one of said independent beam control signals as each of the multiple beams approaches said predetermined beam sensing location; and
   d) ascertaining that each of said independently activated multiple beams has reached said predetermined beam sensing location in a predetermined synchronized fashion according to said corresponding one of said independent beam control signals, said ascertaining further comprising:
      i) enabling the photo sensor in response to said corresponding one of said independent beam control signals;
      j) detecting said independently activated multiple beam via the enabled photo sensor; and
      k) generating a detection signal indicative of said detected independently activated one of said multiple beams.

2. The method of controlling a multiple beam unit according to claim 1 wherein said independent beam control signals are activated at a predetermined time before the activated beams reach said predetermined beam sensing location.

3. The method of controlling a multiple beam unit according to claim 1 wherein said ascertaining further comprising:
   e) detecting said independently activated multiple beam at said predetermined beam sensing location;
   f) generating a detection signal indicative of said detected independently activated multiple beam;
   g) determining whether said detection signal synchronously matches said corresponding one of said independent beam control signals; and
   h) generating a confirmation signal upon the synchronous match.

4. The method of controlling a multiple beam unit according to claim 3 wherein said detection signal and said corresponding one of said independent beam control signals are logically ANDED.

5. The method of controlling a multiple beam unit according to claim 3 wherein said independently activated multiple beam is deactivated as soon as detecting said independently activated multiple beam at said predetermined beam sensing location.

6. The method of controlling a multiple beam unit according to claim 1 wherein each of said independent beam control signals has a short onset period for activating said corresponding one of said multiple beams, said short onset period being only sufficiently long enough to cause said independently activated multiple beam to be detected upon arriving the predetermined beam sensing location.

7. The method of controlling a multiple beam unit according to claim 1 wherein each of said independent beam control signals has a long onset period for activating said corresponding one of said multiple beams, said long onset period being sufficiently long enough to maintain said independently activated multiple beam as said independently activated multiple beam is scanned over the predetermined beam sensing location.

8. The method of controlling a multiple beam unit according to claim 7 further comprising:
   l) calculating a sub-scanning pitch vertical to the scanning direction between the multiple beams based upon detecting of said independently activated multiple beams; and
   m) adjusting the sub-scanning pitch to a desired sub-scanning pitch value.

9. The method of controlling a multiple beam unit according to claim 1 wherein said independent beam control signals include a first beam control signal and a second beam control signal for respectively activating a first one of the multiple beams and a second one of the multiple beams which reaches the predetermined beam sensing location later than said first one of the multiple beams, each of said independent beam control signals has an activation timing element for activating a corresponding one of the multiple beams, said activation timing element of said second beam control signal being generated based upon said activation timing element of said first beam control signal.

10. The method of controlling a multiple beam unit according to claim 1 wherein said independent beam control signals include a first beam control signal and a second beam control signal for respectively activating a first one of the multiple beams and a second one of the multiple beams, said first beam control signal and said second beam control signal being independently generated.

11. The method of controlling a multiple beam unit according to claim 1 further comprising:
   n) calculating a scanning pitch in the scanning direction between the multiple beams based upon detecting of said independently activated multiple beams; and
   o) adjusting the scanning pitch to a desired scanning pitch value.

12. The method of controlling a multiple beam unit according to claim 1 further comprising:
   p) generating an image scanning clock signal for forming the desired image on the image forming surface based upon said ascertaining of said predetermined synchronized fashion.

13. A system for controlling multiple beams, comprising:
   an image forming surface for forming an image;
   a multiple beam unit for selectively emitting multiple beams towards said image forming surface, the multiple beams forming an image on an image forming surface;
   a photo sensor located at a predetermined beam sensing location near said image forming surface for detecting the multiple beams, said photo sensor generating a detection signal upon detecting each of the multiple beams;

a scanner for scanning each of the multiple beams first towards said photo sensor and then onto said image forming surface in a predetermined scanning direction;

a beam control signal generating unit connected to said multiple beam unit for generating a predetermined number of independent beam control signals, said independent beam control signals independently activating each of the multiple beams as each of the multiple beams approaches said predetermined beam sensing location; and a beam synchronization unit connected to said photo sensor and said beam control signal generating unit for ascertaining that said independently activated multiple beam has reached said predetermined beam sensing location in a predetermined synchronized fashion according to said corresponding one of said independent beam control signals and said detection signal, said beam synchronization unit further including a photo sensor enabling unit connected to said photo sensor and said beam control signal generating unit for selectively enabling said photo sensor in response to said independent beam control signals.

14. The system for controlling a multiple beam unit according to claim 13 wherein said beam synchronization unit determines whether said detection signal synchronously matches said corresponding one of said independent beam control signals.

15. The system for controlling a multiple beam unit according to claim 14 wherein said beam synchronization unit logically ANDs said detection signal and said independent beam control signals.

16. The system for controlling a multiple beam unit according to claim 13 wherein said beam control signal generating unit generates said independent beam control signals each having a short onset period during which one of said multiple beams is activated, said short onset period being only sufficiently long enough to cause said photo sensor to detect said independently activated multiple beam upon arriving the predetermined beam sensing location.

17. The system for controlling a multiple beam unit according to claim 13 wherein said beam control signal generating unit generates said independent beam control signals each having a long onset period during which one of said multiple beams is activated, said long onset period being sufficiently long enough to maintain said independently activated multiple beam activated as said independently activated multiple beam is scanned over the predetermined beam sensing location.

18. The system for controlling a multiple beam unit according to claim 17 further comprising:

a sub-scanning calculation unit connected to said beam monitoring unit for calculating a sub-scanning pitch vertical to the scanning direction between the multiple beams based upon the detection signals of said independently activated multiple beams; and a sub-scanning adjustment unit connected to said multiple beam unit and said sub-scanning calculation unit for adjusting the sub-scanning pitch to a desired sub-scanning pitch value.

19. The system for controlling a multiple beam unit according to claim 13 wherein said beam control signal generating unit generates said independent beam control signals including a first beam control signal and a second beam control signal for respectively activating a first one of the multiple beams and a second one of the multiple beams which reaches the predetermined beam sensing location later than said first one of the multiple beams, each of said independent beam control signals having an activation timing element for activating a corresponding one of the multiple beams, said beam control signal generating unit generating said activation timing element of said second beam control signal based upon said activation timing element of said first beam control signal.

20. The system for controlling a multiple beam unit according to claim 13 wherein a beam control signal generating unit generates said independent beam control signals including a first beam control signal and a second beam control signal for respectively activating a first one of the multiple beams and a second one of the multiple beams, said beam control signal generating unit independently generating said first beam control signal and said second beam control signal.

21. The system for controlling a multiple beam unit according to claim 13 further comprising:

a scanning pitch calculation unit for calculating a scanning pitch in the scanning direction between the multiple beams based upon the detection signal of said independently activated multiple beams; and a scanning pitch adjustment unit connected to said scanning pitch calculation unit and said multiple beam unit for adjusting the scanning pitch to a desired scanning pitch value.

22. The system for controlling a multiple beam unit according to claim 13 further comprising:

an image scanning control unit connected to said beam synchronization unit for generating a image scanning clock signal for forming the desired image on the image forming surface.

\* \* \* \* \*